United States Patent
Teyeb et al.

(10) Patent No.: US 9,191,851 B2
(45) Date of Patent: Nov. 17, 2015

(54) CELL SIZE AND SHAPE ESTIMATION IN HETEROGENEOUS NETWORKS

(71) Applicants: Oumer Teyeb, Stockholm (SE); Angelo Centonza, Winchester (GB); Muhammad Ali Kazmi, Bromma (SE); Gunnar Mildh, Sollentuna (SE); Walter Gerhard Alois Müller, Upplands Väsby (SE)

(72) Inventors: Oumer Teyeb, Stockholm (SE); Angelo Centonza, Winchester (GB); Muhammad Ali Kazmi, Bromma (SE); Gunnar Mildh, Sollentuna (SE); Walter Gerhard Alois Müller, Upplands Väsby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 324 days.

(21) Appl. No.: 13/696,615

(22) PCT Filed: Sep. 28, 2012

(86) PCT No.: PCT/SE2012/051043
§ 371 (c)(1),
(2) Date: Nov. 7, 2012

(87) PCT Pub. No.: WO2013/048331
PCT Pub. Date: Apr. 4, 2013

(65) Prior Publication Data
US 2014/0064247 A1 Mar. 6, 2014

Related U.S. Application Data

(60) Provisional application No. 61/540,931, filed on Sep. 29, 2011.

(51) Int. Cl.
| | | |
|---|---|---|
| H04W 24/10 | (2009.01) | |
| H04W 36/32 | (2009.01) | |
| H04W 36/00 | (2009.01) | |
| H04W 36/02 | (2009.01) | |

(52) U.S. Cl.
CPC .......... *H04W 24/10* (2013.01); *H04W 36/0083* (2013.01); *H04W 36/02* (2013.01); *H04W 36/32* (2013.01)

(58) Field of Classification Search
None
See application file for complete search history.

(56) References Cited

U.S. PATENT DOCUMENTS

| | | | |
|---|---|---|---|
| 2002/0082017 A1* | 6/2002 | Hattori | 455/436 |
| 2008/0144528 A1* | 6/2008 | Graves et al. | 370/254 |
| 2009/0264134 A1* | 10/2009 | Xu et al. | 455/437 |

(Continued)

FOREIGN PATENT DOCUMENTS

EP 2364045 A1 9/2011

OTHER PUBLICATIONS

Zte et al., "Consideration of Cell Type and UE mobility state in MRO", 3GPP TSG RAN WG3 #66bis, Velencia, Spain, Jan. 18, 2010, pp. 1-4, R3-100191, 3rd Generation Partnership Project.

*Primary Examiner* — Chi H Pham
*Assistant Examiner* — Vladislav Agureyev
(74) *Attorney, Agent, or Firm* — Coats & Bennett, P.L.L.C.

(57) ABSTRACT

A telecommunications node (28) comprises a communication interface (36) and a parameter controller (40). The node (28) acquires timing advance (TA) information and angle of arrival (AoA) information through the communication interface (36). The timing advance (TA) information and angle of arrival (AoA) information are based on uplink signals received over a radio interface (32) from one or more wireless terminals (30) that are involved or have been involved in handover. The parameter controller (40) uses the timing advance (TA) information and the angle of arrival (AoA) information to make a determination of size and shape of a cell of a radio access network.

38 Claims, 20 Drawing Sheets

(56) References Cited

U.S. PATENT DOCUMENTS

2010/0120449 A1* 5/2010 Jakorinne et al. .......... 455/456.1
2010/0240391 A1* 9/2010 Povey ........................ 455/456.1
2010/0323723 A1* 12/2010 Gerstenberger et al. ... 455/456.5
2011/0159891 A1* 6/2011 Segall et al. ............... 455/456.3
2011/0207456 A1* 8/2011 Radulescu et al. ............ 455/434
2011/0211560 A1* 9/2011 Yamamoto et al. ........... 370/332

* cited by examiner

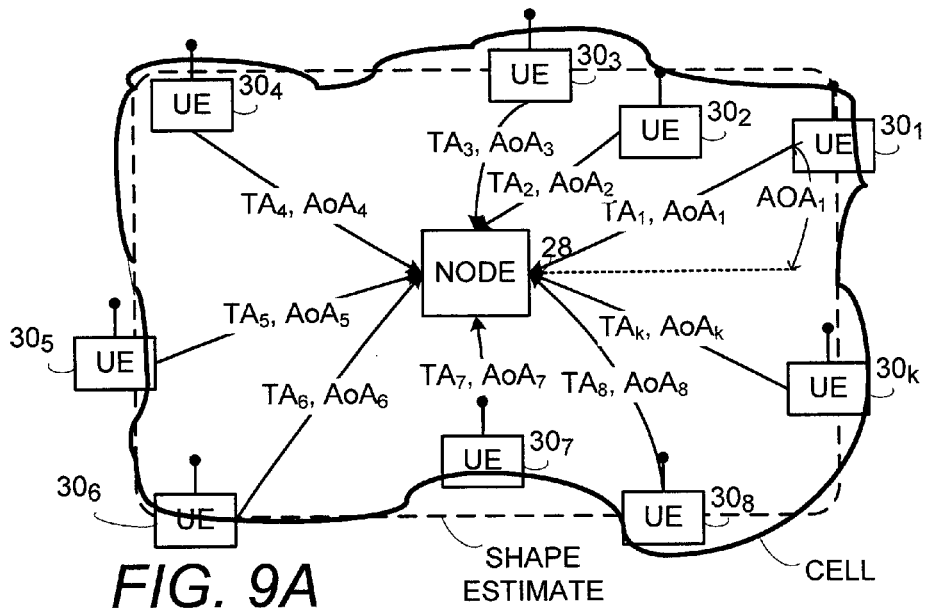
FIG. 9A
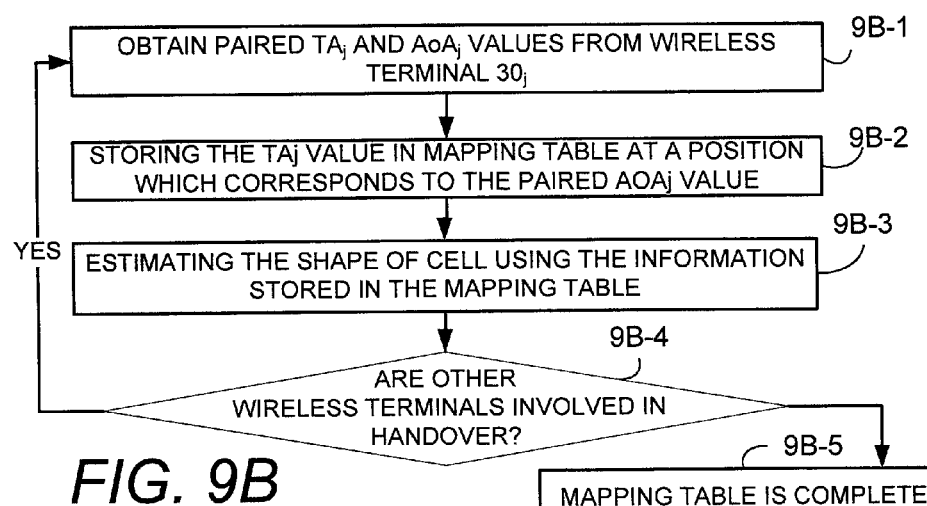
FIG. 9B
FIG. 9C
| MAPPING TABLE | |
|---|---|
| AoA VALUE | TA VALUE |
| $AoA_1$ VALUE | $TA_1$ VALUE |
| $AoA_2$ VALUE | $TA_2$ VALUE |
| ... | ... |
| $AoA_j$ VALUE | $TA_j$ VALUE |
| ... | ... |
| $AoA_k$ VALUE | $TA_k$ VALUE |

CELL SIZE AND SHAPE ESTIMATION IN HETEROGENEOUS NETWORKS

This application claims the priority and benefit of U.S. provisional Patent application 61/540,931, entitled "Cell Size and Shape Estimation in Heterogeneous Networks", filed Sep. 29, 2011, which is incorporated herein by reference in its entirety.

TECHNICAL FIELD

This invention pertains to telecommunications, and particularly to method and apparatus for estimation and communication of cell size and shape information.

BACKGROUND 1.0 Mobile Communication Systems

In a typical cellular radio system, wireless terminals, also known as mobile stations and/or user equipments (UEs), communicate via a radio access network (RAN) to one or more core networks. The radio access network covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipment units (UE) within range of the base stations.

In some versions of the radio access network, several base stations are typically connected, e.g., by landlines or microwave, to a controller node, such as a radio network controller (RNC) or a base station controller (BSC), which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). The UMTS terrestrial radio access network (UTRAN) is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Packet System (EPS) have completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to radio network controller (RNC) nodes. In general, in E-UTRAN/LTE the functions of a radio network controller (RNC) node are distributed between the radio base stations nodes, e.g., eNodeBs in LTE, and the core network. As such, the radio access network (RAN) of an EPS system has an essentially "flat" architecture comprising radio base station nodes without reporting to radio network controller (RNC) nodes.

1.1 Heterogeneous Networks

There have been several proposals to meet the ever increasing traffic demands and high quality expectations from end users for mobile broadband services. The upgrading of the existing base stations to use higher data rate technologies such as High Speed Packet Access (HSPA) or Long Term Evolution (LTE), or use other optimizations such as Multiple Input Multiple Output (MIMO), antenna tilting, etc., is one of the most widely adopted means to meet these demands. This can be further enhanced by a straightforward increasing the number of base stations (eNBs) in the network, known as macro densification. However, these methods of improving the data rate can provide system gains only to a certain extent and they can end up being very expensive. As such, the concept of Heterogeneous Networks (HetNets), where the existing homogeneous network is overlaid with additional lower-power, low-complexity base stations, is currently being researched as a solution to mitigate the cost and/or capacity limitations of macro densification or upgrading.

The homogeneous layer of macro cells is known as a "macro" layer, as the eNBs in this layer have large coverage areas. The non-homogenous layer contains low power nodes such as "picos" (low power eNBs, for indoor or outdoor usage), "femtos" (home base stations (HeNBs), usually for indoor home usage) or relays (usually for coverage extension). Femtos that are open only to few users (within a household, a shop, etc.), are termed within 3GPP as Closed Subscriber Group (CSG). FIG. 1 illustrates an example HetNet deployment scenario.

HetNets are expected to offer a low cost alternative to macro densification and will more likely be effective as the deployment of the low power nodes can be made more focused towards the hot spots and areas with coverage problems. The term "small cell" is used to refer to a pico or a femto cell for the rest of this document.

1.2 Handover in LTE

Handover is one of the important aspects of any mobile communication system, where the system tries to assure service continuity of the User Equipment (UE) by transferring the connection from one cell to another depending on several factors such as signal strength, load conditions, service requirements, etc. The provision of efficient/effective handovers (minimum number of unnecessary handovers, minimum number of handover failures, minimum handover delay, etc.), would affect not only the Quality of Service (QoS) of the end user but also the overall mobile network capacity and performance.

In LTE, UE-assisted, network controlled handover is utilized. The network configures the UE to perform measurements and send measurement reports when certain criteria are met. Based on these reports the UE is moved, if required and possible, to the most appropriate cell that will assure service continuity and quality. A UE measurement report configuration comprises the reporting criteria (whether it is periodic or event triggered) as well as the measurement information that the UE has to report.

In LTE, the most important measurements metric used are the Reference Signal Received Power (RSRP) and Reference Signal Received Quality (RSRQ). RSRP is a cell specific measure of signal strength and it is mainly used for ranking different cells for handover and cell reselection purposes, and it is calculated as the linear average of the power of the Resource Elements (REs) which carry cell-specific Reference Symbols (RSs). The RSRQ, on the other hand, also takes the interference into consideration by taking the total received wideband power into account as well.

One of the configuration parameters that UEs receive from their serving eNB is a parameter called "S_measure", which tells the UE when to start measuring neighboring cells. If the measured RSRP of the serving cell falls below the S_measure, indicating the signal of the serving cell is not that strong anymore, the UE starts measuring the signal strength of RSs from the neighboring cells.

While the S_measure determines when the UE starts measuring other cells, there are several other measurement configuration parameters that specify the triggering of handover measurement reports from the UE. The following event-triggered criteria are specified for intra-Radio Access Technology (RAT) measurement reporting in LTE:

Event A1: Serving cell becomes better than absolute threshold.
Event A2: Serving cell becomes worse than absolute threshold.
Event A3: Neighbor cell becomes better than an offset relative to the serving cell.
Event A4: Neighbor cell becomes better than absolute threshold.
Event A5: Serving cell becomes worse than one absolute threshold and neighbor cell becomes better than another absolute threshold.

The most common measurement report triggering event related to handover is A3; its usage is illustrated in FIG. 2. The triggering conditions for event A3 can be formulated as Expression (1):

$$N > S + (H_s - CIO_{s,n})$$  Expression (1)

where N and S are the signal strengths of the neighbor and serving cells, respectively, $H_s$ is the hysteresis parameter that the serving cell applies for event A3, and $CIO_{s,n}$ is the Cell Individual Offset (CIO) set by the serving cell for that specific neighbor cell. If this condition is satisfied and it remains valid for a certain duration known as Time To Trigger (TTT), the UE sends a measurement report to the serving eNB (in FIG. 2, entry condition for event A3 is satisfied at point A and measurement report is sent at point B in time when both entry condition and TTT criteria are fulfilled, i.e., the event criteria is fulfilled). When the serving eNB gets the measurement report, it may initiate a handover towards a neighbor.

1.3 Mobility Robustness Optimization

As indicated above, handover in LTE is controlled via several parameters. Incorrect parameter settings can lead to several problems, such as (for example) Radio Link Failure (RLF) and Ping pong handover.

If the parameters are set in such a way that the UE does not report handover measurements on time and the UE loses the radio connection with the serving cell, the UE experiences a Radio Link Failure (RLF) before handover could be initiated. This is known as "Too Late HO" and the UE tries to re-establish the connection with another cell after the RLF detection timers have expired. On the other hand, if the parameters are set to trigger handover very early, RLF might occur shortly after handover preparation has been completed and the UE has either completed or it is in the process of completing it in the target cell. This is known as "Too Early HO" and the UE tries to re-establish the connection with the source cell after the RLF detection timers have expired. Even if the handover is triggered at the right time, incorrect settings of the CIO can make the UE to handover to the wrong cell, which is followed by a RLF and a re-establishment request in a cell other than the target cell or the source cell. This is known as "HO to a wrong cell".

Improper handover parameter setting can make the UE handover back and forth between two neighboring cells, e.g., "Ping pong handover". An example of this is a setting that makes the triggering conditions for the handover events (A3) valid between the source and neighbor cells at the same time.

When the UE receives a certain number of (N310) consecutive "out of sync" indications from the lower layer, it assumes a physical layer problem is ensuing, and a timer (T310) is started. If the UE does not receive a certain number of (N311) consecutive "in sync" indications from the lower layer before T310 expires, RLF is detected. RLF is also detected when random access problem is indicated from MAC or upon indication that the maximum number of RLC retransmissions has been reached.

Another type of failure is a HO failure (HOF). When the UE receives a HO command (i.e., RRCConnectionReconfigurationRequest with mobilityControlInfo), it starts a timer (T304), and if this timer expires before the HO is completed (i.e., RRCConnectionReconfigurationComplete message is sent by the UE), a HO failure is detected.

The less the number of RLFs and HOFs in the system, the better the performance, both from user and system perspective. As such, it is very desirable to configure the system parameters (the HO parameters discussed above being the main ones) appropriately.

Configuring all the HO parameters manually is too expensive and can be very challenging. As such, Mobility Robustness Optimization (MRO) has been introduced in 3GPP to automate the dynamic configuration of handover parameters. MRO tries to gather statistics on the occurrence of Too Late HOs, Too Early HOs and HO to the wrong cell, and these statistics are used to adjust the handover parameters such as Hysteresis, CIO and TTT.

For MRO, the different HO problems discussed above are communicated between neighboring cells in different ways. For Too Late Handovers, an RLF INDICATION message is sent via X2 from the eNB to which the UE tries to re-establish a connection to the eNB where the RLF occurred. The RLF INDICATION message contains:

PCI of the cell in which the UE was connected prior to RLF (known as failure cell).
ECGI of the cell where RRC re-establishment attempt was made.
UE Identity: C-RNTI and MAC ID of the UE in the failure cell
RLF report (in a UE RLF Report Container IE If an eNB receives an RLF INDICATION message from a neighbor eNB, and if it finds out that it has sent a UE CONTEXT RELEASE message towards that neighbor eNB within the last Tstore_UE_cntxt seconds (i.e., it means that very recently the concerned UE was handed over properly to it from the same eNB), the eNB responds by sending a HANDOVER REPORT message that indicates Too Early Handover.

If an eNB receives an RLF INDICATION message from a neighbor eNB, and if it finds out that it has sent a UE CONTEXT RELEASE message towards another neighbor eNB within the last Tstore_UE_cntxt seconds (i.e., it means that very recently the concerned UE was handed over properly to it from another eNB), the eNB responds by sending a HANDOVER REPORT message that indicates Handover to the Wrong Cell.

The HANDOVER REPORT message contains:
Type of detected handover problem (Too Early Handover, Handover to Wrong Cell);
ECGI of source and target cells in the handover;

ECGI of the re-establishment cell (in the case of Handover to Wrong Cell);

Handover cause (signaled by the source during handover preparation).

Thus, by analyzing the received RLF INDICATION and HANDOVER REPORT messages within certain duration, eNBs can configure the optimal HO parameters to be used with their neighbors.

1.4 Enhanced Mobility Robustness Optimization

As mentioned above, current mechanisms such as Mobility Robustness Optimization (MRO) try to optimize mobility by fine tuning of mobility thresholds such as CIOs with the objective of preventing further failures from occurring.

Though the standardized MRO mechanisms can be very useful, they have limitations, specifically in HetNet scenarios because the cells involved in mobility are a mixture of large coverage layer cells and small hot spot coverage cells aimed at increasing capacity in a much localized way. Hence, the success of UE mobility in a HetNet scenario greatly depends on the time the UE is expected to spend on a given cell (i.e., how big the cell is and how fast the UE is moving). If this is not considered, UEs can experience lots of unnecessary handover (i.e., fast speed UE handed to a small sized neighbor and to be handed over after a very short duration to another neighbor) or even failures (e.g., if handover of a high speed UE to a small sized neighbor is initiated, target cell signal may become very weak by the time handover is completed and failure may occur).

Currently, UE speed information is used to adjust cell reselection (cell reselection thresholds) and handover parameters (TTT) to some extent. First the UE estimates its speed (high, medium, normal, known as the mobility state of the UE) based on MobilityStateParameters configuration received from the eNB, which relates the number of handovers in a given time to a certain mobility state. Thus, in the case of handover, the UE calculates its mobility state and adjusts the TTT accordingly by multiplying the TTT with a scaling factor associated with each mobility state. The drawbacks of this way of handover parameter adjustment, especially in a HetNet scenario are:

The speed calculation based on number of handover is not accurate even in a homogenous network, and it becomes even worse in a HetNet.

All neighbors are treated equally. For example, the UE adjusts the TTT to the same value whether the concerned target is a big macro cell or a very small pico cell.

On top of that, only the TTT is adjusted in a speed dependent manner, and the same CIO is used regardless of the UE's speed, which can greatly undermine the benefit of the adjusted TTT.

From the above it can be deduced that it would be preferable not to handover UEs moving at high speeds to very small coverage cells due to the UE permanence in the cell being likely very short or even due to the high probability of mobility failures due to the target small cell's signal becoming very weak by the time the handover is completed.

Therefore, for UEs moving at high speed it would be advisable to select the handover target cell not only on the basis of the strongest received signal but also on the basis of the risk of handover failure if the target consists of a very small cell. Namely for these UEs the best target would be a wide coverage cell.

However, if source cell mobility parameters such as TTT are adjusted to allow high speed mobility to "jump" small cell targets and to select directly larger coverage cells, this would degrade the mobility performance of low speed UEs. These UEs in fact would need to be handed over to small coverage cells given that they might be able to camp on such cells for a long time while moving at slow speed.

U.S. Provisional Patent application 61/515,225, filed Aug. 4, 2011, entitled "Improved Handover Robustness in Cellular Radio Communications", which is incorporated by reference herein in its entirety, proposes enhancement of current MRO mechanisms that address both the UE speed and the size of the target cell. Therein it is proposed to add to the X2 RLF INDICATION message the cell size of the cell originating the message. This, combined with UE speed information already contained in the UE RLF Report Container IE, allows the receiving node to adjust its target selection criteria based on UE mobility and neighbor cell size. Furthermore, it was also proposed to include the size of the cells involved in mobility and UE RLF Report Container IE in the X2 HANDOVER REPORT message sent from target eNB to source eNB. The source eNB thus becomes aware of UE measurements taken at the time of failure and size of neighboring cells, which allows the source to adjust its mobility thresholds towards neighbor cells and to prioritize certain targets depending on UE mobility. Differentiated target selection for high speed UEs are proposed where a per-UE, per target cell CIO is used or/and target prioritization at the source eNB is made based on previously monitored failure events.

1.5 Cell Size and its Impact on Random Access Operations in LTE

In Wideband Code Division Multiple Access (WCDMA), one of the predecessors of LTE, the Random Access Channel (RACH) is used for initial network access as well as for short message transmission. In LTE, the RACH use is limited only for initial network access, and is used primarily for the UE to acquire uplink time synchronization (in situations such as when the UE is handed over to a target cell, when it goes from IDLE mode to CONNECTED mode, or if it has lost the synchronization due to RLF). An uplink synchronized UE can also use the RACH for the purposes of sending a Scheduling Request (SR) if it doesn't have any other uplink resource allocated in which to send the SR.

Two kinds of RACH procedures are available in LTE, namely contention-based and contention-free. For contention-based RA, the UE randomly chooses a preamble, while a pre-assigned preamble is used for the contention-free cases. Contention free is usually the preferred method for time-critical cases such as synchronization during handover.

There are totally 64 preambles, a certain number of which are reserved for contention free access by the eNB. The ones available for contention-based access are broadcasted to all UEs, while contention-free ones are dedicatedly assigned on need basis.

Four Preambles formats as shown in table 1 are defined for FDD:

TABLE 1

RA preamble formats in LTE.

| Preamble Format | Cyclic Prefix (μs) | Sequence duration (μs) | Sub frames required | Cell Range |
|---|---|---|---|---|
| 0 | 103.13 | 800 | 1 | up to 14 km |
| 1 | 684.38 | 800 | 2 | up to 77 km |
| 2 | 203.13 | 1600 | 2 | up to 29 km |
| 3 | 684.38 | 1600 | 3 | up to 100 km |

Since actual physical transmission occurs in units of subframes (1 ms), the remaining time from the sum of the cyclic prefix and sequence duration determines how far away the UE can be without overlapping another UE's access attempt (the guard time) and hence the coverage.

While the RA preamble format determines the length of the preamble, the generation of the actual preamble is mainly determined by the RootSequenceIndex and ZeroCorrelationZoneConfig (which is the cyclic shift to be applied to the root sequence) parameters. Using these two parameters, it is possible to generate sequences that are orthogonal regardless of the delay spread and the time uncertainty of the UEs. Sixteen different cyclic shift values have been defined and the cyclic shift values are also related to the cell range and the relationship is shown in FIG. 3.

1.6 Measurements 1.6.1 UE Measurements

Most measurements in LTE are done by the UE on the serving as well as on neighbor cells over some known Reference Symbols (RS) or pilot sequences. The measurements are done for various purposes. Some example measurement purposes are: mobility, positioning, self organizing network (SON), minimization of drive tests (MDT), operation and maintenance (O&M or OAM), network planning and optimization etc. The measurements may also comprise of cell identification e.g. PCI acquisition of the target, CGI or ECGI acquisition of the target cell, system information acquisition of the target cell, be it an LTE cell or any inter-RAT cell.

Examples of mobility measurements in LTE are:
Reference symbol received power (RSRP)
Reference symbol received quality (RSRQ)
Examples of well known positioning measurements in LTE are:
Reference signal time difference (RSTD)
RX-TX time difference measurement 1.6.2 eNB Measurements Some measurements may also require the eNB to measure the signals transmitted by the UE in the uplink. One important measurement performed by the eNB in LTE is the estimation of Timing Advance (TA). For LTE, uplink orthogonally is required to avoid intra-cell interference and as such it is important to have all the uplink signals to be time-aligned when they are received at the eNB. Thus, eNBs try to compensate for the propagation delays differences of their UEs (due to their differing distances from the eNB), by instructing them to apply different timing advances, and the UEs will apply the configured timing advance when they are transmitting. The TA can first be estimated during the initial random access procedure when the UE establishes a connection with the eNB (either due to handover or going from IDLE to connected mode). TA updates are then performed throughout the duration the UE is connected to the eNB, as the propagation delay might change, for example due to the movement of the UE, the change of the environment due to movement of other objects in a dense urban setting, etc. For these updates, the eNBs may measure received uplink signals such as Sounding Reference Signals (SRS), Channel Quality Indicator (CQI), ACKs and NACKs in response to downlink data reception, or the uplink data transmission. The details of uplink timing measurements at the eNB are not standardized and left to implementation.

eNBs that have multiple antenna elements could also use their diversity to measure the Angle of Arrival (AoA) of the uplink signals that receive from their UEs. The AoA and TA can be used to estimate the relative co-ordinates of the UEs within the cell.

2.0 Problems with Existing Solutions

As discussed above, including the cell size information in MRO reports can lead to a more accurate configuration of HO parameter that can improve system performance by reducing the occurrence of RLFs and HOFs in HetNets, regardless of the speed of the UEs in the system.

As also discussed above, some rough estimate of the cell size can be made from the random access preambles. However these estimates can only tell the maximum possible cell size that can use such a preamble. Also, the minimum cell size which can be guessed from these is about 800 m (see FIG. 3). As such, it will be impossible to distinguish a pico cell of 50 m radius with an LTE macro cell of 500 m radius because they can both use similar preamble formats and cyclic shifts.

Another problem in using the RA preambles is that the preambles are decided based on the overall coverage area (how much delay the UEs signal could experience). That means in the case of remote site deployments such as Distributed Antenna Systems (DAS), the length of the fibre to the remote cells must be considered as part of the cell radius. Since the speed of electromagnetic waves over fibre is only two thirds of the speeds in free space, the total cell radius reduces the values shown in Table 1.

In a homogenous network that has only macro cells, the cell size can be roughly estimated based on the transmission power used by the eNBs, and they are rather static. However, the effective cell size/shape is highly impacted by the environment. This is illustrated in FIG. 4, where a base station is deployed in a urban-like environment. The base station is installed at a four-way intersection, with a building at each corner. If there were no buildings, the size/shape of the cell would have been as the one depicted in the dashed lines. However, due to the big indoor propagation loss, the effective size/shape of the cell would be reduced to the grey area. Although the example of FIG. 4 shows the impact of static buildings, temporal changes in the environment caused by moving objects, seasonal changes (e.g. the falling of leaves, snow melting, etc.), construction of new buildings, etc. will also impact the effective cell size/shape. Thus, it is very challenging to obtain accurate cell size/shape information during the radio planning phase, and the effective cell size/shape can vary from time to time.

Performing handovers solely based on radio conditions can lead to sub-optimal results, since the cell shape as well as its overlapping region with its neighbours can be highly irregular. As shown in FIG. 5, due to the propagation environment, the three cells have varying shapes. If a UE is leaving cell A in the vicinity of region x, then cell B is the obvious handover candidate. On the other hand, in region Y, if a UE is handed towards cell B from cell A, it is very likely that soon it will have to be handed over to cell C. It might also be possible that the UE (especially if it is moving at high speed) will experience a failure soon after it has been handed over to B. The failure may occur because there may not be sufficient time to perform measurements, report them to eNB B and handover executed properly during the short period that the UE stays in cell B. A handover algorithm that is based only on radio conditions, without considering the neighbor cell shapes and overlapping region might always try to handover a UE from cell A to cell B, whether the UE is approaching cell B in region x or y, possibly causing unnecessary handovers, or even a connection failures.

In HetNets even having detailed information about the environment will not provide accurate cell size/shape information due to two main reasons: Cell Range Expansion (CRE) and the location of small cells relative the macro eNBs.

2.1 Cell Range Expansion

The big differences in the transmit powers of small cells and macros means the downlink coverage of the small cells is much smaller than the macros. However, in the uplink this is not the case because the uplink coverage depends on the received power at the eNBs (be it a pico/femto or macro), and as such it is similar for all eNBs and the uplink handover boundaries can be determined based only on the channel gain (i.e., selecting the node that provides minimum path loss). Thus, the uplink and downlink handover boundaries can be quite different in HetNets, as compared to the homogenous network case in which they are very similar. Due to the small size of pico/femto cells, the path loss between UE and Pico/Femto eNB is relatively small (provided the UE is in proximity of the Pico/Femto cell).

However, the reduced Tx power of such cell might mean that the UE is outside the pico/femto downlink coverage area. This is illustrated in FIG. 6.

If serving cell selection is based only on downlink received signal strength (i.e., RSRP) as in LTE release 8, most of the UEs will select the macros and the small cells may end up serving almost no UEs, which is against one of the primary reasons for installing small cells to begin with, i.e., sharing the load of the macros. Cell Range Extension (CRE) is the expansion of the coverage of the small cell in order to balance the load between the macros and small cells. This can be realized in several ways, for example:

Adjust the transmission power of the small cell depending on the load in the system Use cell selection offsets and handover thresholds that favour the small cell Adopting the use of Almost Blank Subframes (ABS) at overlaying macro cell, in order to reduce interference on such subframes (by preventing the macro from transmitting any data traffic) and therefore increase the radio quality of Pico/Femto cell signal to cover a larger area).

With Cell Range Extension (CRE), the best uplink signal will be received by the best node (the small cell) in the expanded cell area, and thus some load is relieved from the macro. However, the downlink interference is high in the expanded cell area. Several advanced interference management techniques, such as interference cancellation at the UE and enhanced Inter-cell Interference Co-ordination (eICIC).

With regard to the reporting of cell sizes, Cell Range Extension (CRE) imposes a problem because the effective cell size of the small cells will be time varying.

2.2 Relative Location of Small Cells

The effective size of the pico cells is also dependent on the relative location of the small cells relative to the macro eNBs. For example, simulation results have shown (which are duplicated in Table 2) that the coverage area of the small cell can vary considerably, by more than threefold, when the small cell is placed 1.5 cell radius away from the macro eNB (where the macro eNB is situated at the far end of the cell) as compared with the case where the small cell is located 0.5 cell radius away.

TABLE 2

ESTIMATES OF THE PICO COVERAGE AREA RADIUS

| Frequency and ISD | Cell selection | 0.5x radius | 1x radius | 1.5x radius |
|---|---|---|---|---|
| 2 GHz, 500 m | RSRP | 7 m | 14 m | 21 m |
| 2 GHz, 500 m | PL | 16 m | 33 m | 50 m |
| 700 MHz, 1732 m | RSRP | 24 m | 49 m | 74 m |
| 700 MHz, 1732 m | PL | 57 m | 117 m | 176 m |

Thus, two small cells using the same transmission power and range extension settings can end up having quite different effective cell sizes due to differences in their relative location from the macro, and as such it impacts the reporting of cell sizes that is addressed hereinbelow.

SUMMARY

According to an aspect of the technology disclosed herein, base station nodes (e.g., eNBs) use the Timing Advance (TA) and Angle of Arrival (AoA) estimations based on the uplink signal they are receiving from their UEs that are involved in handover for the estimation of their own sizes and shapes as well as that of their neighbors. The eNBs that have a more accurate and up to date information of the cell size and the shape of their neighbors can optimally adjust their cell selection and handover related parameters/procedures. Apart from the TA and AoA estimates, the UE history information that is sent from a source eNB to a target eNB during handover (in a X2 HANDOVER REQUEST message or in a S1 HANDOVER REQUIRED message), along with any possible available information of the UE speed, can also optionally be employed to get cell size estimates of the source cell. The estimations performed by the eNBs (of their own cells as well as neighbor cells) can be consolidated to get a more accurate estimate.

In one of its aspects the technology disclosed herein concerns a telecommunications node which comprises a communication interface and a parameter controller. The node acquires timing advance (TA) information and angle of arrival (AoA) information through the communication interface based on uplink signals received over a radio interface from one or more wireless terminals that are involved or have been involved in handover. The controller is configured to use the timing advance (TA) information and the angle of arrival (AoA) information to make a determination of size and shape of a cell of a radio access network.

In an example embodiment and mode the node is a base station which serves a cell of the radio access network; the communication interface is a radio communication interface; and the cell is a cell served by the base station.

In an example embodiment and mode in which the node is a base station, the base station uses a first frequency. The controller is configured to use the timing advance (TA) and the angle of arrival (AoA) information to determine a common border of the cell with another cell that uses another frequency. The controller excludes the another frequency from a list of frequencies to be measured by the wireless terminal until the wireless terminal is within a predetermined distance of the common border.

In an example embodiment and mode the controller establishes or modifies a handover triggering parameter dependent on the size and/or the shape of the cell.

In an example embodiment and mode the controller scales a handover triggering parameter dependent on a degree of overlap of the cell with another cell.

In an example embodiment and mode the controller initiates handover of the wireless terminal to another cell in view of at least one of size and shape of the cell.

In an example embodiment and mode the controller makes the determination by preparing a list of angles from a center of the cell, the list of angles including the received angle of arrival information, and for angles included on the list associating the timing advance information as radii of the cell.

In an example embodiment and mode the controller periodically makes the determination of the size and the shape of the cell.

In an example embodiment and mode the controller is configured to use speed of travel of the one or more of the wireless terminals to make the determination of the size and the shape of the cell.

In an example embodiment and mode the controller is configured to use the timing advance (TA) and the angle of arrival (AoA) information based on the uplink signals which the node receives from the one or more wireless terminals that are involved in handover to make at least a partial determination of the size and/or the shape of another cell. In an example embodiment and mode the cell is a macro cell and the another cell is a cell served by another base station, the another base station being located in an interior of the macro cell. In an example embodiment and mode, the partial determination is a determination of the size and the shape of a portion of the another cell that intersects with the cell.

In an example embodiment and mode the controller also uses UE history information provided to the node by a wireless terminal which has been handed over from another cell.

In an example embodiment and mode the node is provided with pre-configured shape information and the controller is configured to use the timing advance (TA) and the angle of arrival (AoA) information in conjunction with the pre-configured shape information to make the determination of the size and the shape of the cell.

In an example embodiment and mode the node comprises another communication interface through which the node provides a report of information concerning the size and the shape of the cell to another base station or to another node. In an example embodiment and mode the node receives from the another node through the another communication interface a consolidated determination of the size and/or the shape of the cell. The consolidated determination was made by the another node on the basis of respective plural reports of information regarding size and shape of the cell. The respective plural reports include a report from the base station and from other base stations.

In another of its aspects the technology disclosed herein concerns a base station which serves a cell of a radio access network and which comprises a radio communication interface and a parameter controller. The base station communicates through the communication interface over a radio interface with a wireless terminal. The controller makes a selection between plural target cells for handover of the wireless terminal, the selection being based at least partially on (1) location of a candidate handover wireless terminal in the cell served by the base station and (2) at least one of shape or size of the plural target cells.

In another of its various aspects the technology disclosed herein concerns a node of a communications network. The node comprise an interface through which the node receives, from plural base stations of a radio access network, respective plural reports of information regarding size and shape of a cell served by a selected base station, including a report from the selected base station which includes a unilateral determination of the size and the shape of the cell served by the selected base station, the unilateral determination having been made using timing advance (TA) and angle of arrival (AoA) information based on an uplink signals which the selected base station received from one or more wireless terminals that were involved in handover. The node further comprises a controller which uses the plural reports to make a consolidated determination of the size and/or the shape of the cell served by the selected base station.

In an example embodiment and mode at least some of the plural reports include an accuracy assessment regarding the information contained in the respective reports, and wherein in making the consolidation determination the controller weights the information contained in the respective reports in accordance with the accuracy assessment included in the respective reports. In an example embodiment and mode, the accuracy assessment comprises at least one of number of samples of the uplink signals and duration of sampling of the uplink signals.

In another of its many aspects the technology disclosed herein concerns a method of operating a telecommunications node. The method comprises obtaining timing advance (TA) information and angle of arrival (AoA) information based on uplink signals received over a radio interface (32) from one or more wireless terminals that are involved or have been involved in handover. The method further comprises using the timing advance (TA) and angle of arrival (AoA) information to make a determination of size and shape of a cell of a radio access network.

In an example mode the method further comprises establishing or modifying a handover triggering parameter dependent on the size and/or the shape of the cell.

In an example mode the method further comprises establishing or modifying a handover triggering parameter dependent on the size and/or the shape of the cell.

In an example mode the method further comprises scaling a handover triggering parameter dependent on a degree of overlap of the cell with another cell.

In an example mode the method further comprises initiating handover of the wireless terminal to another cell in view of at least one of size and shape of the cell.

In an example mode the method further comprises that the node is a base station using a first frequency, and the method further comprises using the timing advance (TA) and the angle of arrival (AoA) information to determine a common border of the cell with another cell that uses another frequency; and, excluding the another frequency from a list of frequencies to be measured by the wireless terminal until the wireless terminal is within a predetermined distance of the common border.

In an example mode the method further comprises making the determination by preparing a list of angles from a center of the cell, the list of angles including the received angle of arrival information, and for angles included on the list associating the timing advance information as radii of the cell.

In an example mode the method further comprises using speed of travel of the one or more of the wireless terminals to make the determination of the size and the shape of the cell.

In an example mode the method further comprises using the timing advance (TA) and the angle of arrival (AoA) information based on the uplink signals which the base station receives from the one or more wireless terminals that are involved in handover to make at least a partial determination of the size and/or the shape of another cell.

In an example mode the partial determination is a determination of the size and the shape of a portion of the another cell that intersects with the cell.

In an example mode the method further comprises also using UE history information provided to the base station by a wireless terminal which has been handed over to make the determination.

In an example mode the method further comprises the node having pre-configured shape information and using the timing advance (TA) and the angle of arrival (AoA) information in conjunction with the pre-configured shape information to make the determination of the size and the shape of the cell.

In an example mode the method further comprises the node providing a report of information concerning the size and the shape of the cell to another node.

In an example mode the method further comprises receiving from the another node a consolidated determination of the size and/or the shape of the cell served, the consolidated determination having been made by the another node on the basis of respective plural reports of information regarding size and shape of the cell, the respective plural reports including a report from the base station and from other base stations.

In yet another of its aspects the technology disclosed herein concerns a method of operating a base station which serves a cell of a radio access network. The method comprises communicating over a radio interface with a wireless terminal; and, making a selection between plural target cells for handover of the wireless terminal, the selection being based at least partially on (1) location of a candidate handover wireless terminal in the cell served by the base station and (2) at least one of shape or size of the plural target cells.

In still another of its aspects the technology disclosed herein concerns a method of operating a node of a communications network. The method comprises receiving, from plural base stations of a radio access network, respective plural reports of information regarding size and shape of a cell served by a selected base station, including a report from the selected base station which includes a unilateral determination of the size and the shape of the cell served by the selected base station, the unilateral determination having been made using timing advance (TA) and angle of arrival (AoA) information based on an uplink signals which the selected base station received from one or more wireless terminals that were involved in handover. The method further comprises using the plural reports to make a consolidated determination of the size and/or the shape of the cell served by the selected base station.

In an example mode the method further comprises at least some of the plural reports including an accuracy assessment regarding the information contained in the respective reports, and making the consolidation determination by weighting the information contained in the respective reports in accordance with the accuracy assessment included in the respective reports. In an example implementation, the accuracy assessment comprise at least one of a number of samples of the uplink signals and duration of sampling of the uplink signals. In an example implementation, the method further comprises making plural consolidated determinations, each of the plural consolidated determinations being of the size and shape of plural cells served by the respective plural base stations which provide the respective plural reports; and transmitting information regarding one or more of the plural consolidated determinations to the plural base stations.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 9A is a diagrammatic view illustrating a method in which a base station node estimates its own size according to an example mode.

FIG. 9B is a flowchart illustrating basic acts or steps which comprise the method illustrated by FIG. 9A.

FIG. 9C is a diagrammatic view of a mapping table involved in the method illustrated by FIG. 9B.

DETAILED DESCRIPTION

Figure 1:
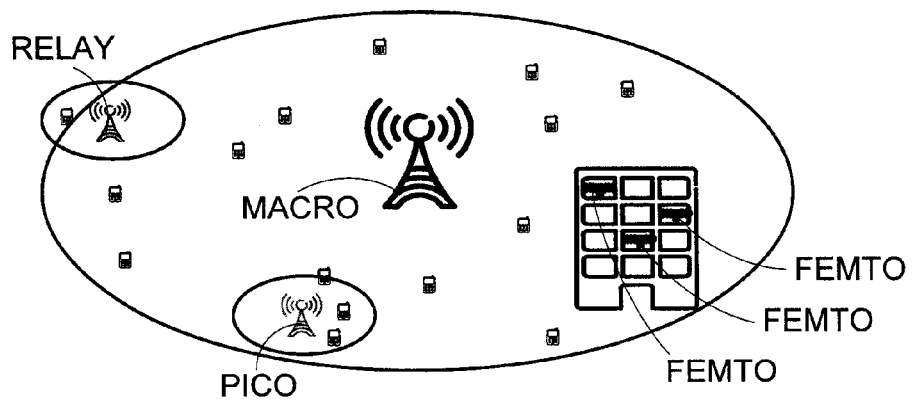
FIG. 1 is a diagrammatic view of portions of a heterogeneous network according to an example embodiment.
Figure 2:
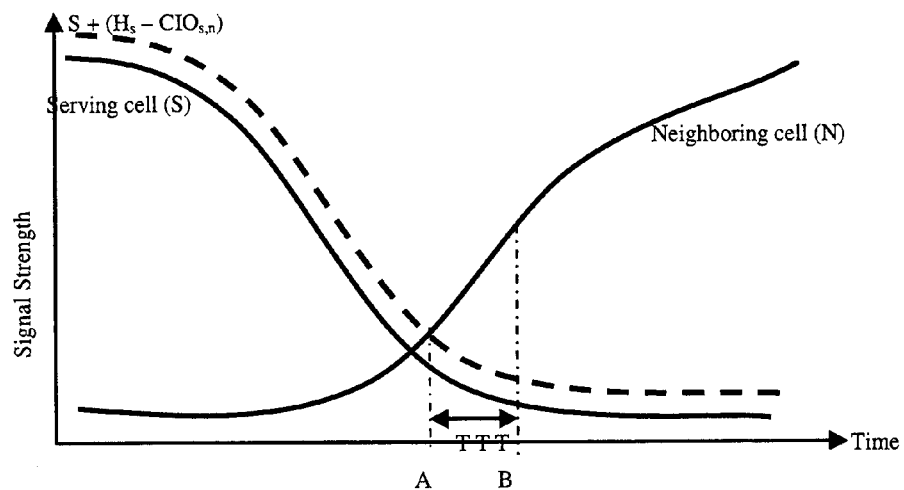
FIG. 2 is a graph showing handover triggering in Long Term Evolution (LTE).
Figure 3:
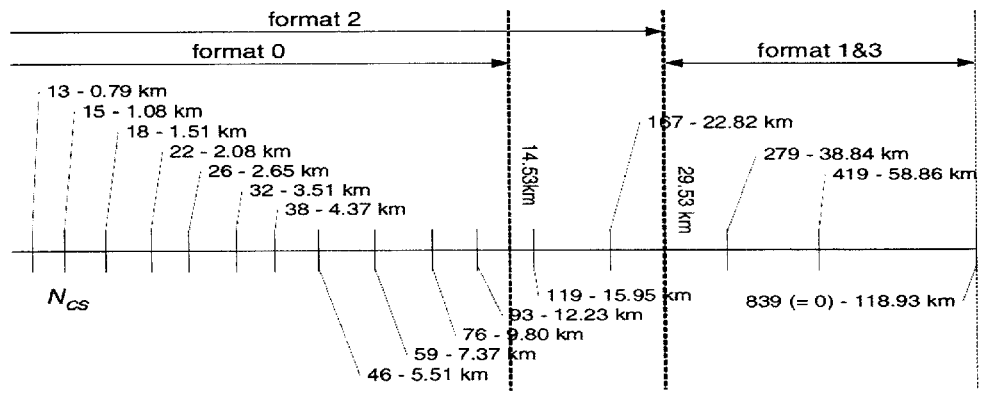
FIG. 3 is a graph showing cyclic shift and preamble format in relation to cell size.
Figure 6:
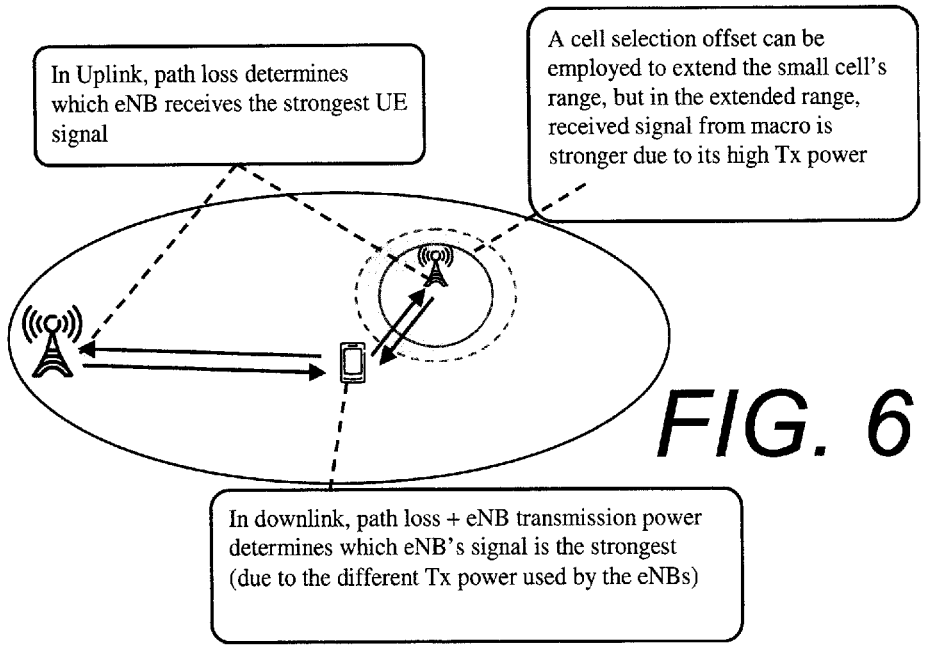
FIG. 6 is a diagrammatic view illustrating cell selection and range expansion.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

According to an aspect of the technology disclosed herein, eNBs use the Timing Advance (TA) and Angle of Arrival (AoA) estimations based on the uplink signal they are receiving from their UEs that are involved in handover for the estimation of their own sizes and shapes as well as that of their neighbors. The eNBs that have a more accurate and up to date information of the cell size and the shape of their neighbors can optimally adjust their cell selection and handover related parameters/procedures. Apart from the TA and AoA estimates, the UE history information that is sent from a source eNB to a target eNB during handover (in the X2 HANDOVER REQUEST message, along with any possible available information of the UE speed, can also optionally be employed to get cell size estimates of the source cell. The estimations performed by the eNBs (of their own cells as well as neighbor cells) can be consolidated to get a more accurate estimate.

Figure 7:
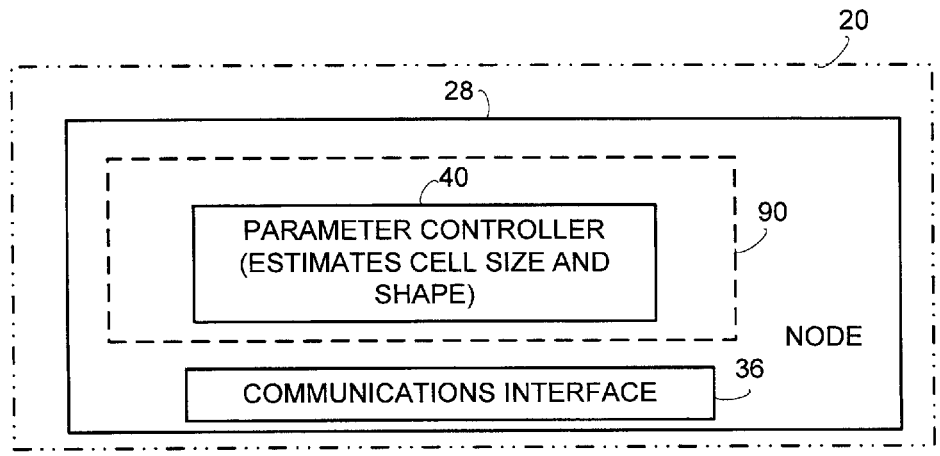
FIG. 7 is a schematic view of an example communications network comprising a base station node that comprises a parameter controller 40 according to an example embodiment.

FIG. 7 shows, within the dashed double-dotted line, portions of a communications network 20 including a node 28. The node comprises communications interface 36 and parameter controller 40. The node 28 receives both timing advance (TA) signals and angle of arrival (AoA) signals through communication interface 36. Both the timing advance (TA) signals and angle of arrival (AoA) signals are uplink signals received over a radio interface from one or more wireless terminals that are involved or have been involved in handover. The parameter controller 40 uses the timing advance (TA) signals and angle of arrival (AoA) signals to make a determination of size and shape of a cell of a radio access network.

Figure 7A:
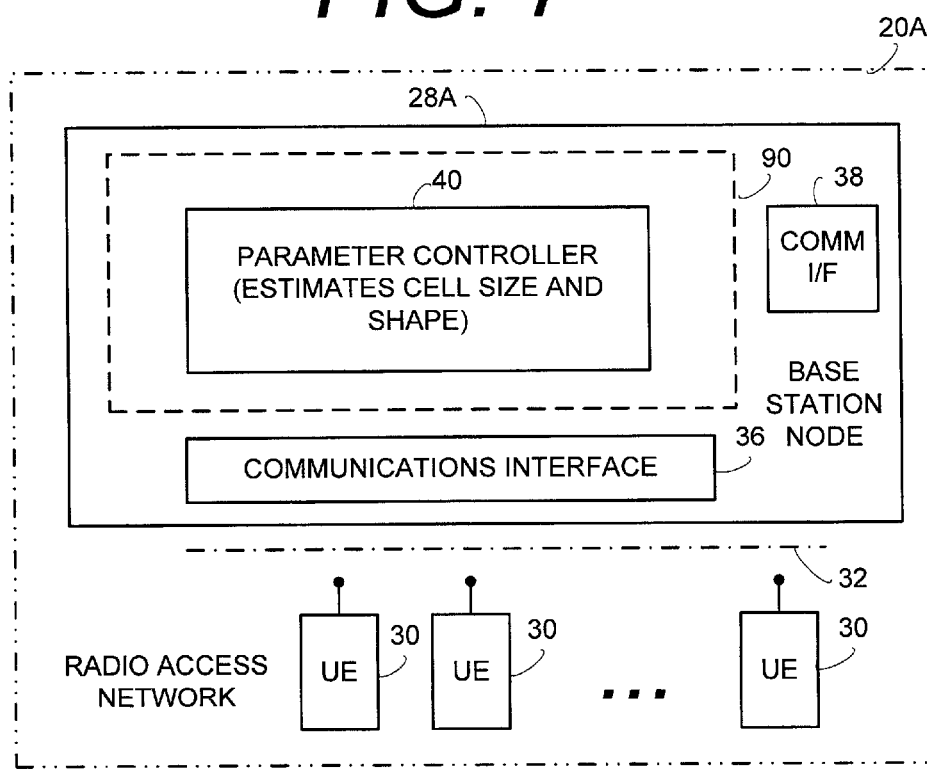
FIG. 7A is a schematic view of an example communications network showing more detail of a base station node that comprises a parameter controller according to an example embodiment.

FIG. 7A illustrates an example embodiment wherein node 28A is a base station node which serves a cell of a radio access network 20A. The base station node 28 may be, for example, a node such as an eNodeB, also known as an eNB, wherein the communication interface 36 is a radio communication interface which communicates with one or more UEs (also known as wireless terminals 30) across an air or radio interface 32.

The base station node 28A comprises the first communication interface 36 through which the base station node communicates over the radio interface 32, as well as another communication interface 38 through which the base station node 28A may communicate with one or more other base station nodes. The parameter controller 40 is configured or arranged to use the Timing Advance (TA) and Angle of Arrival (AoA) estimations based on the uplink signals that are received from the UEs that are involved in handover for the estimation of the sizes and shapes of its own cell (the cell served by the base station node 28 in which the parameter controller 40 resides) and/or the shapes and sizes of the cells of their neighbors.

The timing advance (TA) estimate(s) 50 and angle of arrival (AoA) estimate(s) 52 as described herein are measurements that the node 28 performs from the uplink signals that it is receiving from the wireless terminals 30 and/or on eNB downlink transmitted signals depending upon the type of measurement. The timing advance (TA) estimate(s) 50 and angle of arrival (AoA) estimate(s) 52 may be acquired individually from the handed-over UEs after handover, or even during HO (because the initial TA can be first estimated from the random access procedures during handover also). The TA can be determined by node 28 after handover from either: (1) eNB Rx-Tx time difference measurement (e.g. TA=eNB Rx-Tx time difference measurement), or (2) eNB Rx-Tx time difference measurement and UE UE Rx-Tx time difference measurement (e.g. TA=eNB Rx-Tx time difference measurement+UE Rx-Tx time difference measurement). In case of (2) in order to determine TA the eNB just after HO can request UE to perform UE Rx-Tx time difference measurement and report it back. AoA is measured by eNB on uplink signals received from the wireless terminal 30.

Figure 7B:
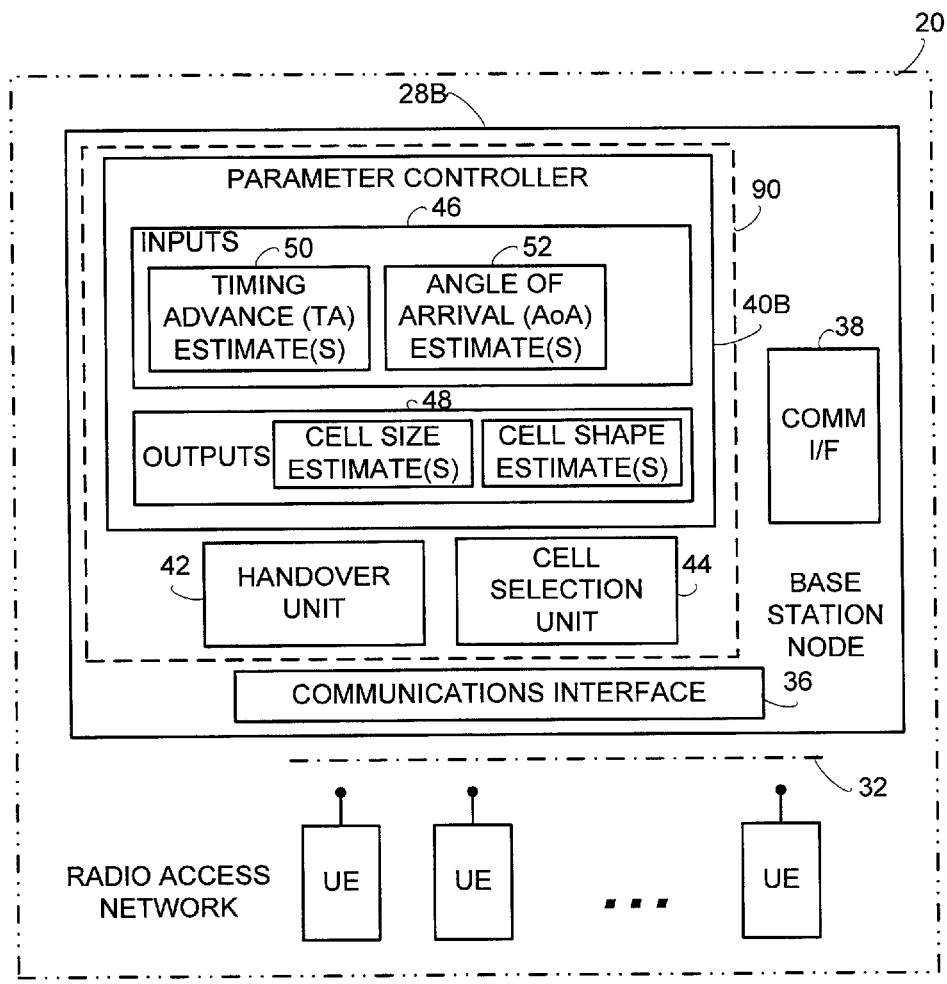
FIG. 7B is a schematic view of an example communications network showing more detail of a base station node that comprises a parameter controller according to another example embodiment.

FIG. 7B shows a more detailed implementation of a base station node 28B comprising parameter controller 40B. In the embodiment of FIG. 7B, the base station node 28B is shown as comprising handover unit 42 and cell selection unit 44 in addition to parameter controller 40B. It will be understood by the person skilled in the art that typically a base station node comprises yet other units and functionalities. However, those functionalities and units particularly germane to the technology disclosed herein are illustrated in FIG. 7B. FIG. 7B further shows the parameter controller 40B as comprising input section 46 and output section 48. Inputs received by the parameter controller 40 in its input section 46 are the timing advance (TA) estimate(s) 50 and the angle of arrival (AoA) estimate(s) 52. Using the inputs of the input section 46, the parameter controller 40 generates the estimates of the output section 48, particularly the cell size estimate(s) 54 and the cell shape estimate(s) 56. These output estimates may in turn be applied to other units of the base station node, such as the handover unit 42 and the cell selection unit 44.

Figure 7C:
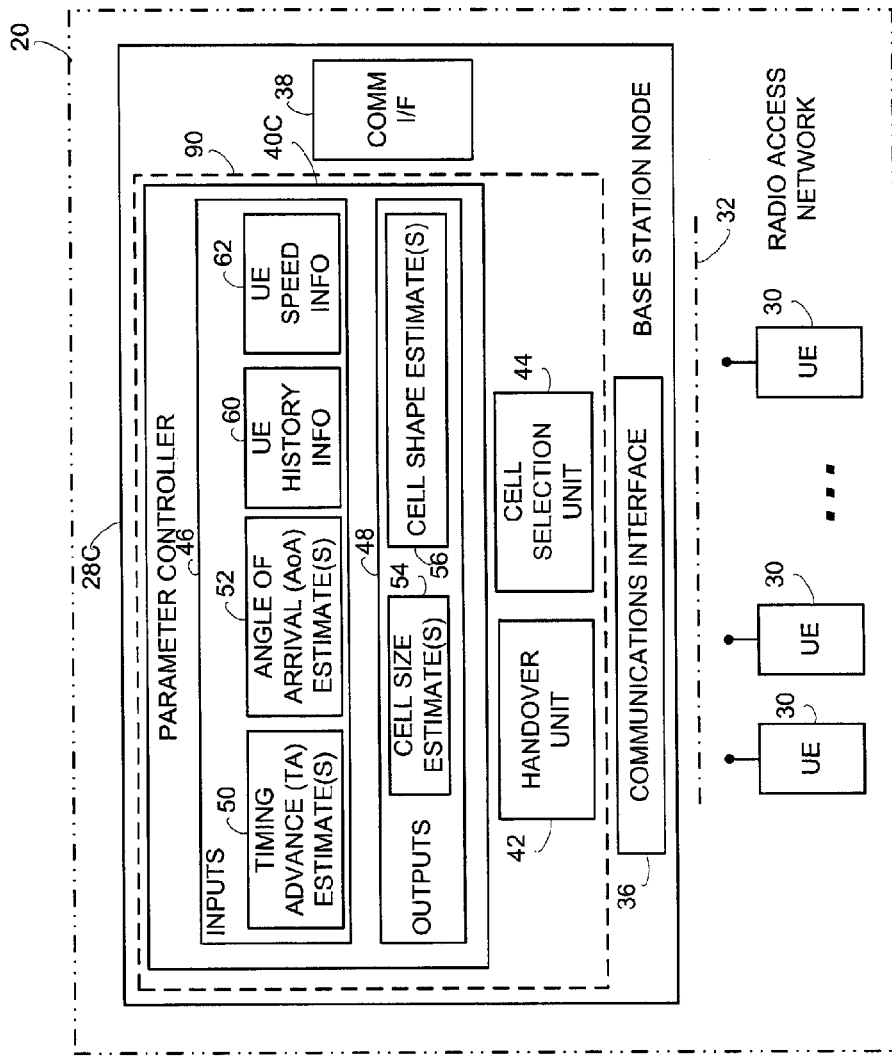
FIG. 7C is a schematic view of an example communications network showing more detail of a base station node that comprises a parameter controller according to yet another example embodiment.

FIG. 7C shows a variation of the base station node of the example embodiment of FIG. 7B. The base station node 28C of FIG. 7C differs from that of FIG. 7B in that, e.g., its input section 46 further includes UE history information 60 and UE speed information 62, as discussed herein. The node 28 may gather the UE history information (e.g., UE history information 60) that it obtains from neighboring cells during inbound X2/S1 handovers. The UE history information 60 may contains a list a predetermined number of cells, e.g., up to 16 cells (including the source cell sending the handover request) in which the UE was active, and also the type of the cells (whether it is very small, small, medium or large) and the time spent in each cell. Table 3 shows an example UE history where the UE became active in cell A, and was handed over to cells B, C, and D, and in which cell D will pass on this UE history information towards the target cell when it hands over the UE. The UE history information thus already provides a possibility to communicate cell size between neighbors during handover using the "cell type" flag, but its use is rather limited to only four values (very small, small, medium, and large). The UE information as such can indicate some information regarding the relative size of the cells (i.e., the larger the cell, the more likely it is that the UE spends longer time in there).

TABLE 3

Example UE history information

| CELL | TYPE | DURATION (s) |
|------|------|--------------|
| A | LARGE | 20 |
| B | SMALL | 1000 |
| C | VERY SMALL | 100 |
| D | SMALL | 500 |

As indicated above with respect to the example embodiment of FIG. 7C, the UE speed information 62 may be used along with the UE history information 60 to obtain a more accurate estimation of the neighbor cell size. If the wireless terminal is aware of its speed (for example, GPS), it can communicate the UE speed to the node 28. In this regard, the node 28 (e.g., eNB) may send a RRC UEInformationRequest message to the wireless terminal, and the wireless terminal responds with a UEInformationResponse message which includes speed information for the wireless terminal, as currently specified in LTE release 10). In case the wireless terminal is not aware of its speed, the eNB can estimate the UE speed from uplink measurements such as Doppler shift. Even if no UE speed information can be gathered, with enough statistics of the UE history information only, some rough estimation of the cell size may be made.

Care should be taken in using the UE history information for neighbor cell size estimation because the UE history information is generated by the eNBs rather than the UE itself, and thus whenever the UE is in IDLE mode, the UE history information is lost. That is, the first entry in the UE history information list might be not that useful for the cell size estimation as the UE could have been IDLE for a long time while traversing the neighbor cell and changed to CONNECTED mode only when it was very close to the cell edge (this is illustrated in Table 2, where the UE history information shows that the UE stayed only 20 seconds in cell A, which is a large cell). It might also be beneficial not to consider the UE history entries duration values larger than a certain value, because those are most likely to be due to the user stopping for quite a while during its stay in that specific cell. In addition, enough statistics have to be gathered from several UE history reports to get more accurate information.

If a target eNB recognizes that the other cells that are included in the UE history information apart from the source cell (for example, if cells B and C are also in the neighbor list of the target cell, for the UE history information shown in Table 2), they can also be used for the size estimation of these cells.

Figure 8:
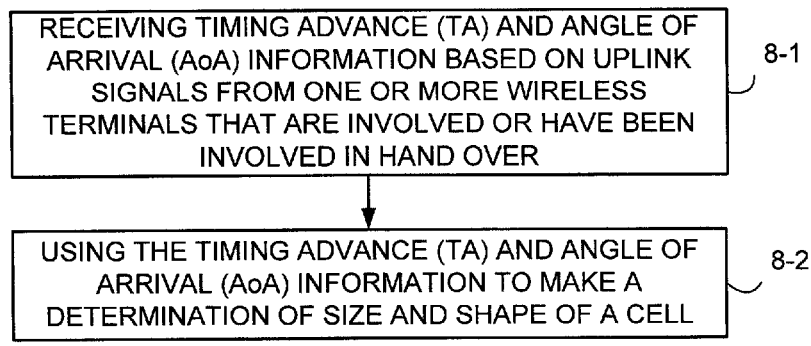
FIG. 8, FIG. 8A, FIG. 8B, and FIG. 8C are flowcharts illustrating example acts or steps involved in example embodiments of methods of determining size and shape of a cell.

FIG. 8 shows example acts or steps involved in an example generic method according to an embodiment of the technology disclosed herein. The acts of FIG. 8 may be performed by parameter controller 40 of a network node 28 according to any of the example embodiments of FIG. 7, FIG. 7A, FIG. 7B, or FIG. 7C, for example. Act 8-1 comprises receiving timing advance (TA) and angle of arrival (AoA) information, based on uplink signals from one or more wireless terminals that are involved or have been involved in handover. Act 8-2 comprises using the timing advance (TA) and angle of arrival (AoA) information to make a determination of size and shape of a cell. As used herein, "making a determination" of size and shape of a cell includes and encompasses, but is not limited to, making an estimation of the size and shape of a cell.

Figure 8A:
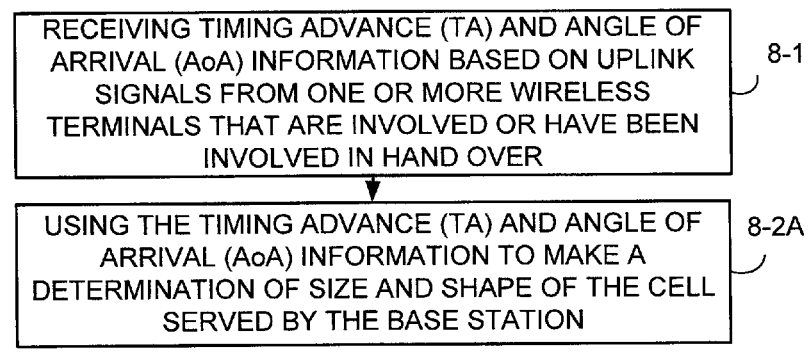
Figure 8B:
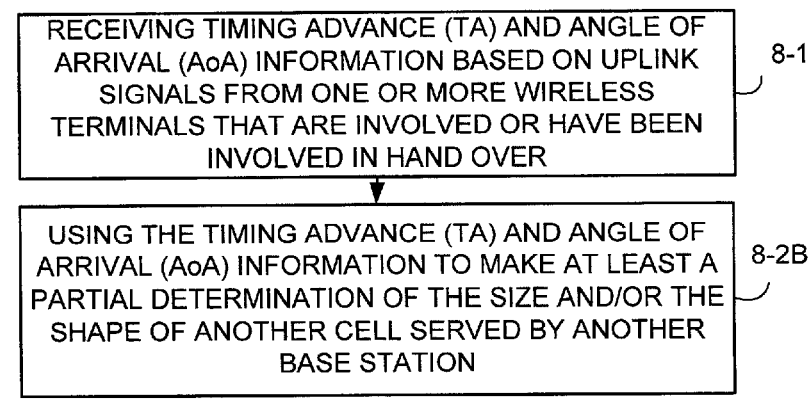
Figure 8C:
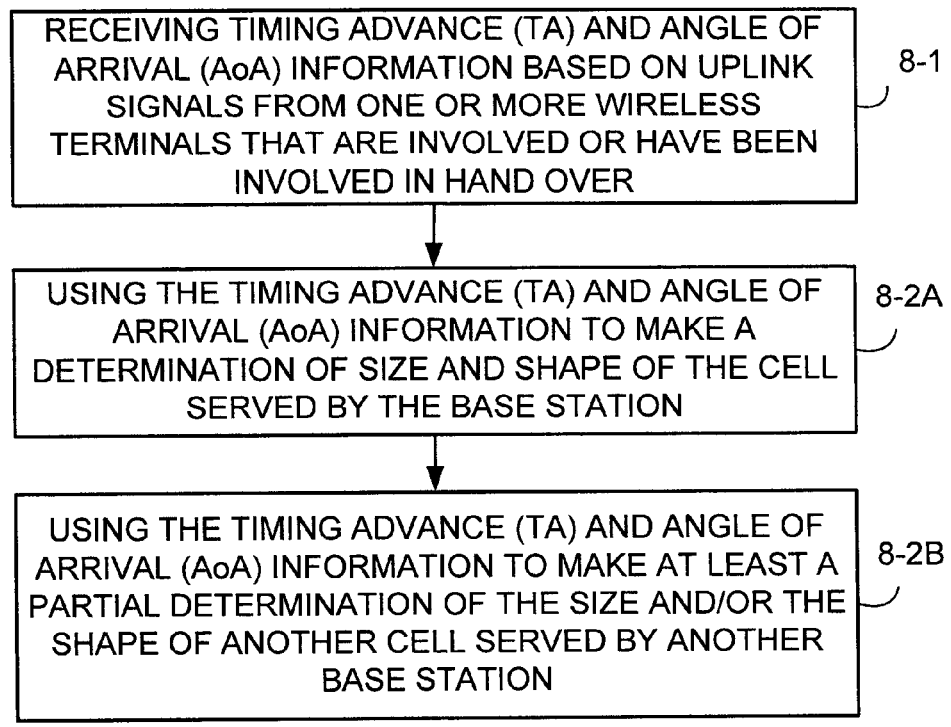

FIG. 8A shows essentially the same acts as FIG. 8, but specifies by act 8-2A that the cell whose size and shape is determined may be the cell served by the base station whose parameter controller 40 makes the determination of act 8-2A. FIG. 8B, by contrast, specifies by act 8-2B that the parameter controller 40 makes at least a partial determination of the size and/or the shape of another cell served by another base station, e.g., by a base station at which the parameter controller 40 which performs act 8-2B is not resident or otherwise hosted. FIG. 8C illustrates that, in an example embodiment and mode, the parameter controller 40 may perform both act 8-2A and act 8-2B, e.g., both make a determination of size and shape of a cell served by the base station which makes the determination (act 8-2A) and make at least a partial determination of the size and/or the shape of another cell served by another base station (act 8-2B).

Figure 4:
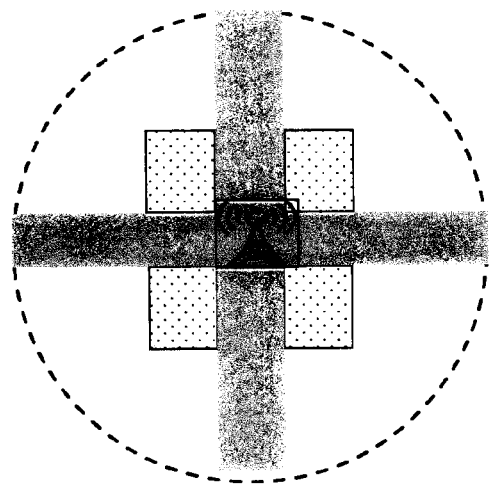
FIG. 4 is a diagrammatic view illustrating cell size/shape dependency on a propagating environment.
Figure 7D:
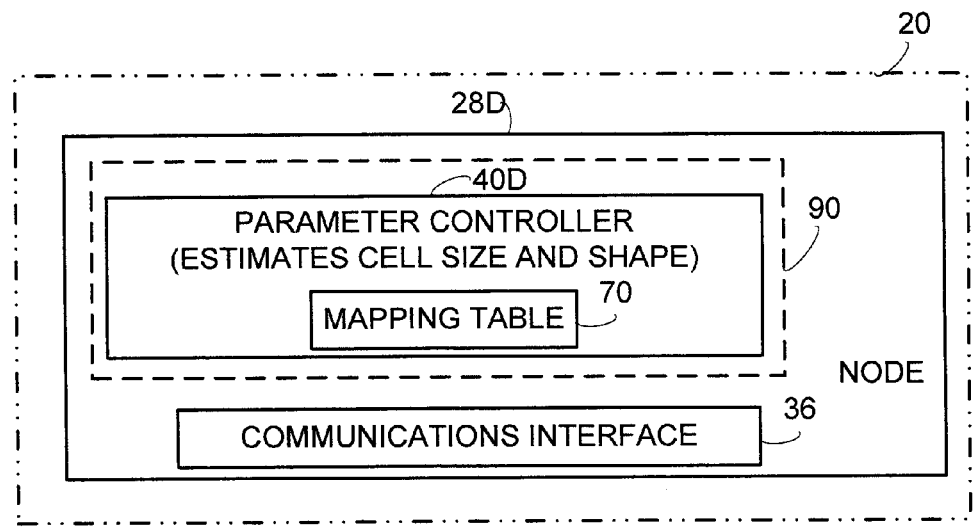
FIG. 7D is a schematic view of an example communications network comprising a parameter controller which in turn comprises a mapping table.

In one example embodiment of the technology disclosed herein, a node 28 gathers the TA and AoA of all the wireless terminals 30 that are being handing over neighbor cells and, based on the TA and AoA of all the handed-over wireless terminals, estimates cell size. FIG. 7D illustrates such a node 28E, in which parameter controller 40E comprises mapping table 70. An example of operation of such example embodiment is illustrated in FIG. 9A, wherein TA and AoA values are obtained by node 28 for each of wireless terminals $30_j$-$30_k$, having been involved in a handover operation between the cell CELL and neighboring cell(s). This can result in a rough estimate of the radius of the cell (for example, for circular or hexagonal cells) or it can be detailed information about the shape of the cell, such as the shape estimate depicted by broken line SHAPE ESTIMATE shown in FIG. 9A. For example, for the case shown in FIG. 9A, it can be a mapping table of the radii at certain degrees from the centre of the cell, which is basically a table of AoAs and TAs. Such mapping/table may be prepared as the parameter controller 40 executes logic such as that depicted by the example acts of FIG. 9B. The mapping table 70 may be prepared by the parameter controller 40 preparing a list of angles from a center of the cell, the list of angles including the received angle of arrival information, and for angles included on the list the parameter controller 40 associating the timing advance information as radii of the cell. Act 9B-1 comprises the parameter controller 40 obtaining the paired $TA_j$ and $AoA_j$ values from a wireless terminal $30j$. Act 9B-2 comprises the parameter controller 40 storing the $TA_j$ value in a mapping table (such as mapping table 70), and in particular the parameter controller 40 storing the $TA_j$ value at a position which corresponds to the paired $AoA_j$ value. In this way the parameter controller 40 constructs the mapping table 70 (see FIG. 9C) by filling in $TA_j$ values for the corresponding $AoA_j$ values. Act 9B-3 comprises estimating the shape of cell CELL using the information stored in the mapping table 70. Act 9B-4 comprises checking if there are yet other wireless terminals involved in handover. If there are other wireless terminals involved in handover, the acts of FIG. 9B may be repeated so that mapping table 70 may be further populated or updated. The updating and population continues until the mapping table 70 is deemed sufficiently complete (act 9B-5). Such detailed border information is very useful for scenarios such as the urban setting shown in FIG. 4, where the propagation environment greatly affects the effective cell size/shape.

Act 9B-4 of FIG. 9B involved checking if there are yet other wireless terminals involved in handover, and repeating certain acts if other wireless terminals are involved in handover. Accordingly, it should also be understood that in any of the example embodiments and modes described herein, the parameter controller 40 may be requested or required to periodically make the determination of the size and the shape of the cell served by the base station. As a further feature, however, the parameter controller 40 may be required or requested to provide a report of a current determination (of the cell shape and size) only when the current determination differs by a threshold relative to a previous determination.

Figure 7E:
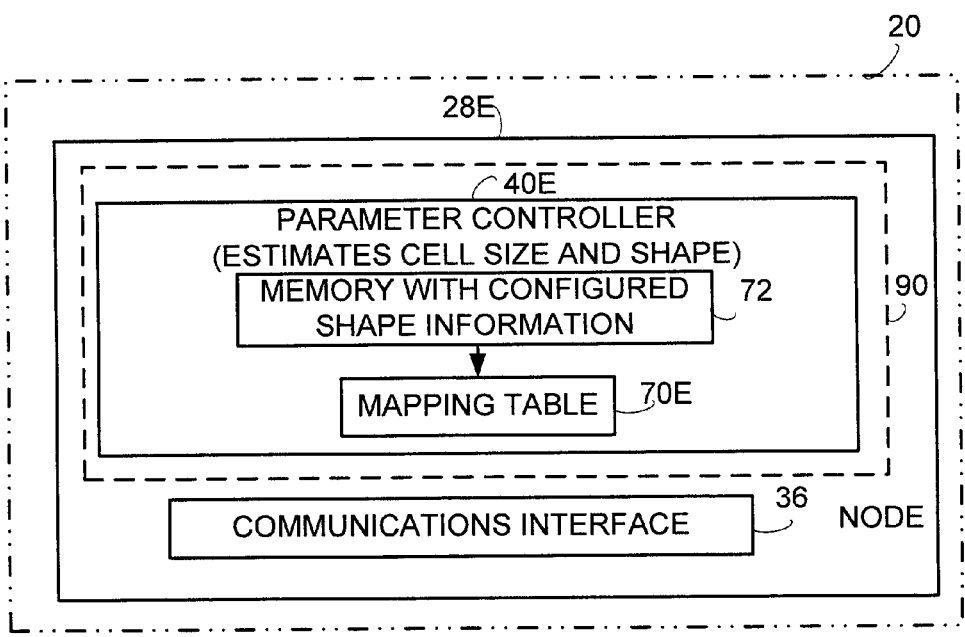
FIG. 7E is a schematic view of an example communications network comprising a parameter controller which in turn comprises an electronic memory which has cell shape information stored or configured therein.

In another example embodiment of the technology disclosed herein, a node such as node 28E of FIG. 7E may have its parameter controller 40E configured with shape information of a cells. For example, parameter controller 40E may comprise electronic memory 72 which has shape information stored or configured therein. In an example implementation the shape information may be pre-stored in memory 72. The shape information may essentially inform mapping table 70E that the shape of the cell whose parameters are to be determined is one of, for example, a single-lobe-shape cell, an elongated cell, an omni-directional cell, a hexagonal cell, or a rectangular cell, etc. With the advantage of already knowing the general shape of the cell, the cell size information from the AoA and TA can be more efficiently loaded into a pre-configured or pre-formatted mapping table 70E, e.g., mapped into more compact information. For example, this could be the height and width of a regular cell that closely approximates the cell (which, for the case illustrated in FIG. 9A, is a rectangle).

Figure 10A:
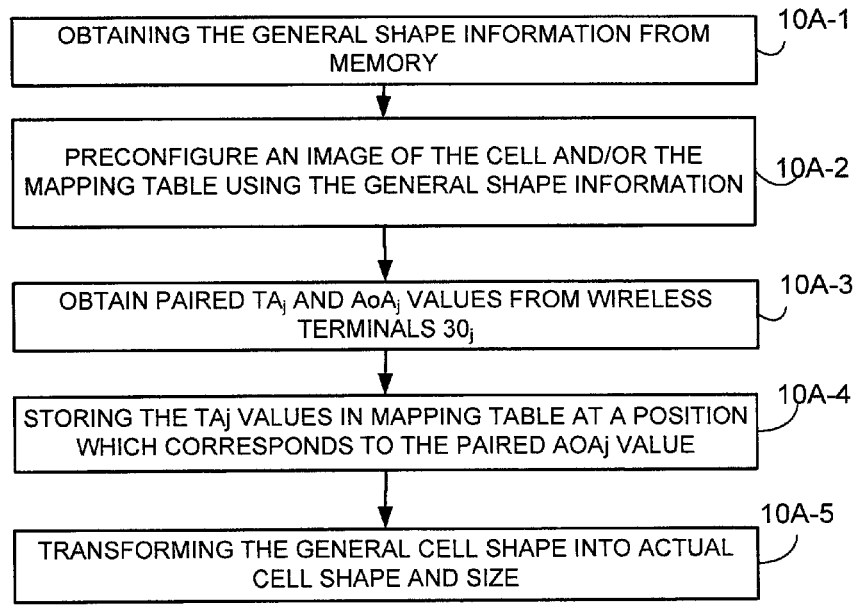
FIG. 10A is a flowchart illustrating basic acts or steps which comprise a method of using stored approximate shape information to determine cell size and shape.
Figure 10B:
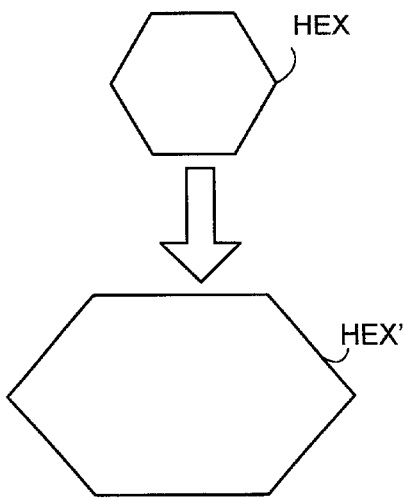
FIG. 10B is a diagrammatic view depicting evolution of an approximate pre-known cell shape to an actual cell shape and size according to the method of FIG. 10A.

An example method of using pre-stored shape information is illustrated by FIG. 10A. Act 10A-1 comprises the parameter controller 40E fetching from cell shape memory 72 the general shape information which is foreknown to approximate the shape of the cell for which more definite cell shape and size parameters are sought. The general shape information obtained from cell shape memory 72 may indicate, for example, that the general cell shape is foreknown to approximate a hexagon, represented by the regular hexagon HEX in FIG. 10B. The general shape information may even suggest or provide a default value of the dimensions of the regular hexagon. As act 10A-2 the parameter controller 40E preconfigures an image of the cell and/or the mapping table 70E by anticipating, e.g., the number of vertices and sides of the cell. As act 10A-3 the parameter controller 40E obtains the paired $TA_j$ and $AoA_j$ values from a wireless terminals $30j$. Act 10A-4 comprises the parameter controller 40 storing the $TA_j$ values in a mapping table (such as mapping table 70E), for the wireless terminals 30, in the manner understood from FIG. 9B. In this way the parameter controller 40 populates or completes the mapping table 70 (in manner analogous to FIG. 9C) by filling in $TA_j$ values for the corresponding $AoA_j$ values. Act 10A-5 comprises developing or estimating data-informed cell shape and size, e.g., by transforming the general cell shape (HEX) into a more realistic image of the actual cell shape and size. In the example of FIG. 10B, it can be seen that the initial general cell shape, thought to be a regular hexagon (HEX) has been transformed and/or redefined by virtue of the acquired data (timing advance (TA) and time of arrival (AoA) data) to an irregular hexagon (HEX') of different dimensions.

Figure 11:
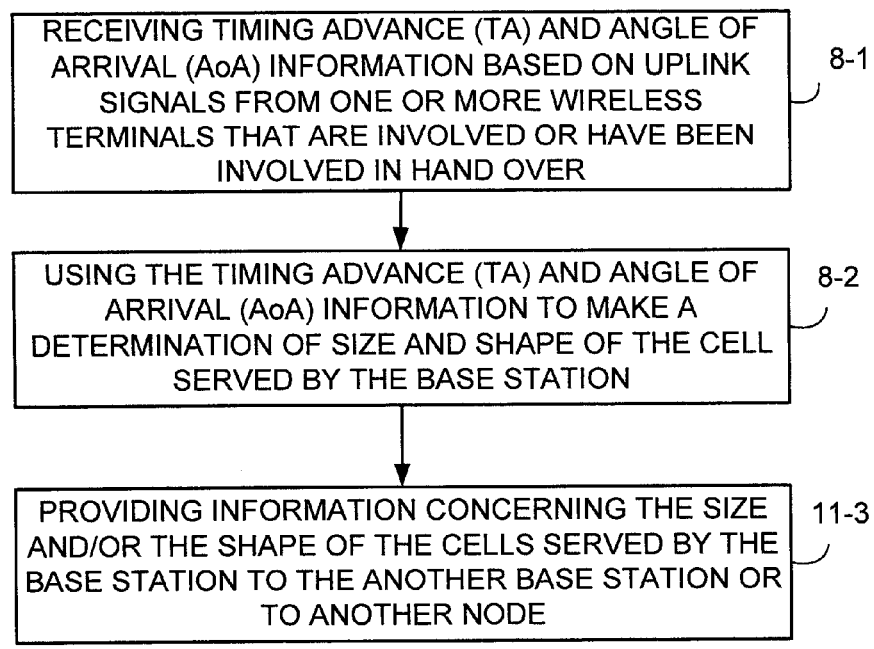
FIG. 11 is a flowchart illustrating example acts or steps involved in an example method wherein a node that determines the shape and size of the cell it serves may communicate such shape and size information to another base station node or another type of node.

FIG. 11 illustrates that a node that determines the shape and size of the cell it serves may communicate such shape and size information to another base station node or another type of node. Basic acts of steps performed in an example embodiment and mode of providing such shape and size information to another node are illustrated in FIG. 11. Act 8-1 and act 8-2 of FIG. 11 are essentially comparable to acts of FIG. 8, resulting in using the timing advance (TA) and angle of arrival (AoA) information to make a determination of size and shape of the cell served by the base station. Act 11-3 comprises the base station node which determines the shape and size of the cell it serves providing information concerning such shape and size to another node, such as another base station node.

Figures 12, 12A, 12B:
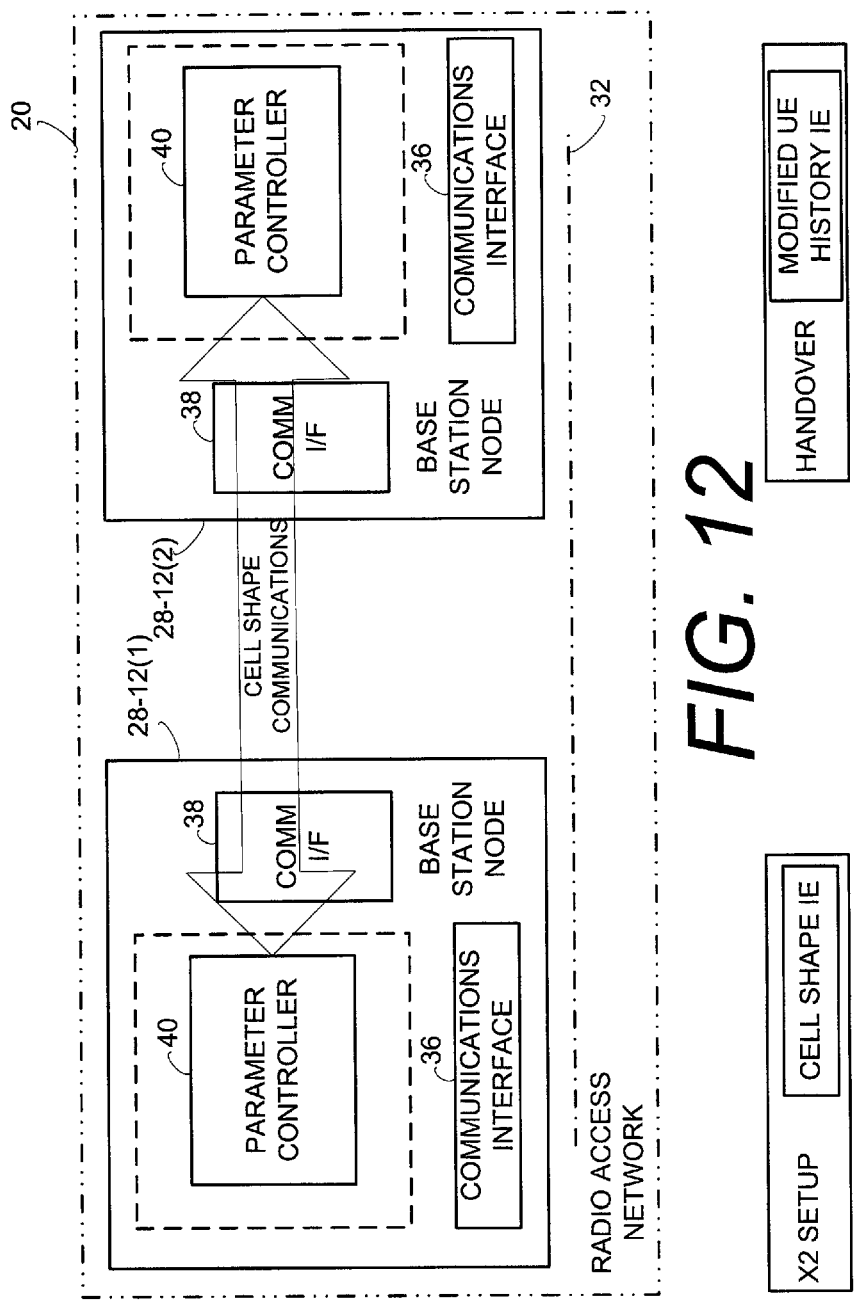
FIG. 12 is a schematic view of an example communications network showing plural base station nodes between which cell size and/or shape communications are provided.
FIG. 12A is a diagrammatic view illustrating a cell shape communications message in the form of an X2 SETUP message.
FIG. 12B is a diagrammatic view illustrating a cell shape communications message in the form of a HANDOVER message.

According to other aspects of the technology disclosed herein, and a more specialized case of the method of FIG. 11, neighboring cells in a heterogeneous network are enabled to become aware of each other's cell sizes and borders through collaborative estimation of their own as well as neighbor cell sizes and shapes. In example embodiments according to such aspects, base station nodes (eNBs) 28 may communicate their cell shapes. For example, an eNB may communicate the cell shape information of a cell its serves to one or more other eNBs. An example of such communication is illustrated by the "cell shape communications" arrow in FIG. 12 wherein the cell shape information is communicated between base station node 28-12(1) and base station node 28-12(2) over an interface such as an X2 interface. This cell shape communication can be done when an X2 is setup between two neighbors using the X2 SETUP REQUEST/RESPONSE messages. For example, the cell shape communication may be facilitated by including extra information element about the shape of the served cells of each eNB (see FIG. 12A). Another alternative (illustrated by FIG. 12B) is to use modified UE history information, which is sent from the serving cell to the target cell when a UE is handed over, by also including the cell shape information.

The base station node 28-12(1) and base station node 28-12(2) thus may, in an example embodiment and mode, be neighboring macro cells, but in other embodiments the neighboring cells may be cells of different rank in a heterogeneous network.

Figure 13:
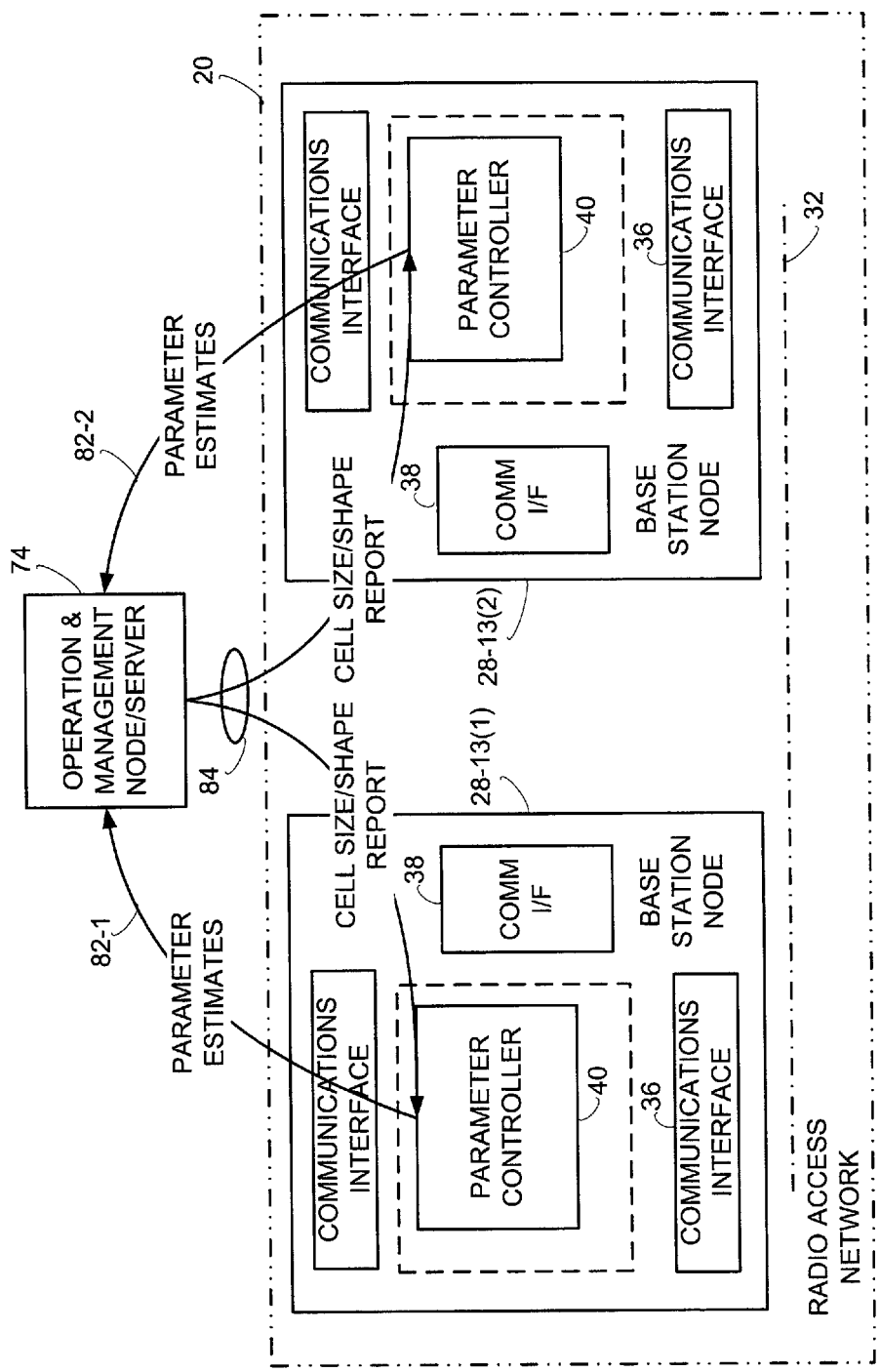
FIG. 13 is a schematic view of an example communications network showing plural base station nodes which provide cell shape communications to a consolidating entity.

In certain example embodiments and modes cell size and shape information for various cells, as obtained by different nodes, may be consolidated and consolidated versions of the cell size and shape information may be reported to the base stations which serve the various cells. By "consolidated versions of the cell size and shape information" is meant cell size and shape information that has been refined, enriched, corroborated, or augmented based on reports of cell size and shape information gathered at or reported from more than one node. For example, FIG. 13 illustrates a network which comprises both base station node 28-13(1) and base station node 28-13(2), as well as an operation and management control node or server (OAM node, server, or controller) 74. In the embodiment and mode of FIG. 13, both base station node 28-13(1) and base station node 28-13(2) generates their respective estimates of their own respective cell shapes and sizes, and possibly also their respective estimates of the cell shape and size of the cell served by the other base station node. For example, base station node 28-13(1) develops its own estimate of the shape and size of the cell served by base station node 28-13(1), and optionally its own estimate of the shape and size of the cell served by base station node 28-13(2). Similarly, base station node 28-13(2) develops its own estimate of the shape and size of the cell served by base station node 28-13(2), and optionally its own estimate of the shape and size of the cell served by base station node 28-13(1). In an example implementation, such estimates are reported by cell parameter estimate messages 82 to OAM node/server 74. For example, base station node 28-13(1) sends cell parameter estimate message 82-1 to OAM controller 74, and base station node 28-13(2) sends cell parameter estimate message 82-2 to OAM controller 74. The OAM node/server 74 analyzes the information received in both cell parameter estimate message 82-1 and cell parameter estimate message 82-2 to develop a cell size/shape report 84 which may be distributed to both base station node 28-13(1) and base station node 28-13(2). The cell size/shape report 84 provides the consolidated version of the cell size and shape information mentioned above.

Figure 14:
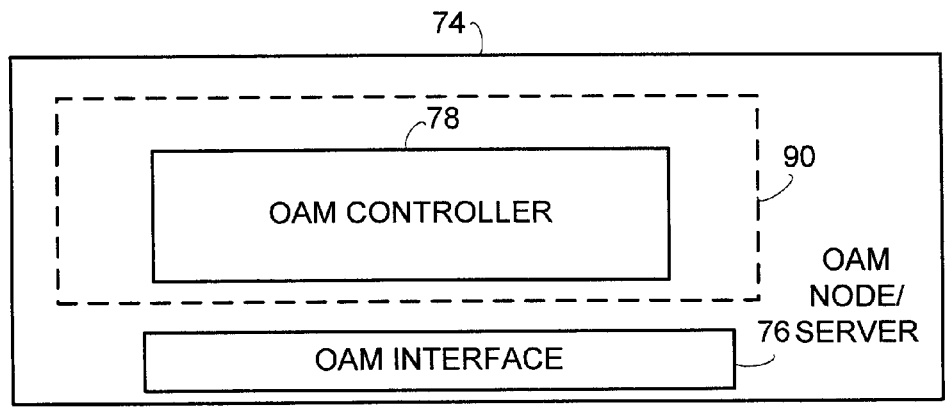
FIG. 14 is a schematic view of an example OAM node/server according to an example embodiment.

FIG. 14 illustrates an example embodiment of OAM node/ server 74. The OAM node/server 74 comprises OAM interface 76 and OAM controller 78. The spring left post 74 receives, through OAM interface 76, from plural base stations of a radio access network, respective plural reports of information regarding size and shape of a cell served by a selected base station. Such reports are illustrated, by way of example, as cell parameter estimate messages 82 of FIG. 13. Such reports include a report from a selected base station which includes a unilateral determination of the size and the shape of the cell served by the selected base station. The unilateral determination is of a type which has been made using timing advance (TA) and angle of arrival (AoA) information based on an uplink signals which the selected base station received from one or more wireless terminals that were involved in handover, in the manner of act 8-1. The OAM controller 78 uses the plural reports to make a consolidated determination of the size and/or the shape of the cell served by the selected base station.

In an alternate implementation, one or more other nodes may serve the consolidating function of the OAM node/server 74. For example, the consolidation function may be located at either base station node 28-13(1) or base station node 28-13(2), and the particular base station node which performs the consolidation function provides the cell size/shape report 84 to the other base station node(s).

Figure 15A:
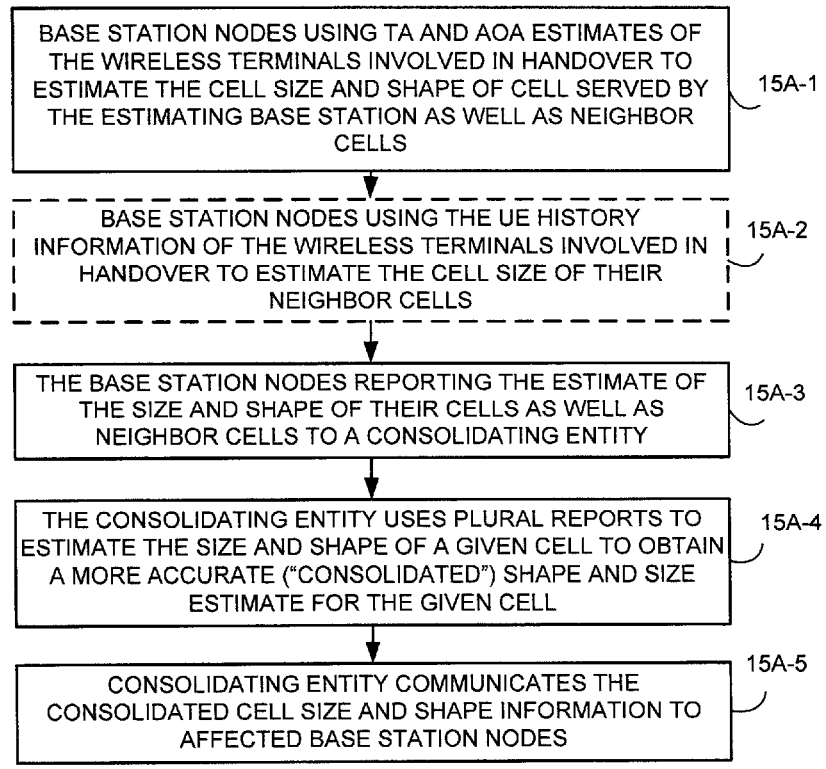
FIG. 15A is a flowchart showing example basic acts of steps performed in accordance with an example mode or embodiment of a first method for consolidating cell shape and size information.

FIG. 15A shows example method which may be implemented for consolidating cell shape and size information. The method of FIG. 15A may apply (not exclusively) to the particular network arrangement of FIG. 13, for example. Act 15A-1 comprises plural base station nodes (e.g., base station node 28-13(1) and base station node 28-13(2) of FIG. 13) using TA and AoA estimates of the wireless terminals being handed over to their cells, or wireless terminals being handed over to their cell by other cells, to estimate the cell size and shape of cell served by the estimating base station as well as neighbor cells. Act 15A-2 is an optional act which comprises the base station nodes using the UE history information 60 of the wireless terminals being handed over to them to estimate the cell size of their neighbor cells. Act 15A-3 comprises the base station nodes reporting the estimate of the size and shape of their cells as well as neighbor cells to a consolidating entity, e.g., to a central entity such as the OAM node/server 74 (see FIG. 13) or to one of the base station nodes, or to each other. The reporting may take the form of the cell parameter estimate messages 82 shown in FIG. 13. As act 15A-4 the consolidating entity estimates the size and shape of a given cell, based on reported estimates performed by the base station serving the given cell as well as estimates reported by base station nodes serving neighboring cells, to obtain a more accurate ("consolidated") shape and size estimate for the given cell. As act 15A-5 the consolidating entity communicates the consolidated cell size and shape information, e.g., the "consolidated version of the cell size and shape information mentioned above, to the base station nodes which were either involved in generating the reports of act 15A-3 or which otherwise have need to know, e.g., the affected base station nodes.

Figure 15B:
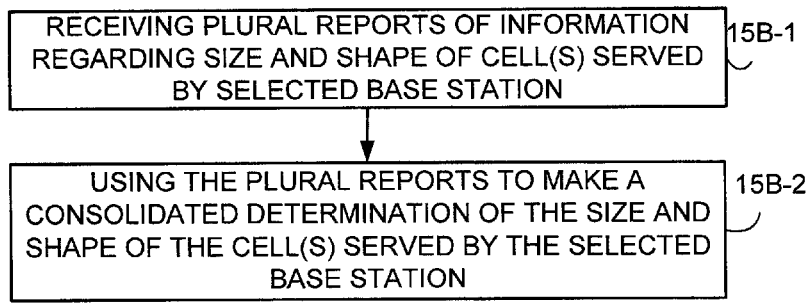
FIG. 15B is a flowchart showing example basic acts of steps performed in accordance with an example mode or embodiment of a second method for consolidating cell shape and size information.

FIG. 15B shows another example method which may be implemented for consolidating cell shape and size information. Act 15B-1 comprises receiving, from plural base stations, respective plural reports of information regarding size and shape of one or more cells served by a selected base station. The plural reports include a report from the selected base station which includes a unilateral determination of the size and the shape of the cell(s) served by the selected base station. The unilateral determination is one which has been made using timing advance (TA) and angle of arrival (AoA) information based on uplink signals which the selected base station received from one or more wireless terminals that were involved in handover, e.g., in the manner of act 8-1. Act 15B-2 comprises using the plural reports to make a consolidated determination of the size and shape of the cells served by the selected base station.

In an example embodiment and mode, at least some of the plural reports (e.g., cell parameter estimate messages 82) may include an accuracy assessment regarding the information contained in the respective reports. In some example embodiments and modes the OAM controller 78, in making the consolidation determination, weights the information contained in the respective reports in accordance with the accuracy assessment included in the respective reports. In some example implementations, the accuracy assessment may comprise at least one of number of samples of the uplink signals and duration of sampling of the uplink signals.

In an example embodiment and mode, the OAM node/server 74 makes plural consolidated determinations, each of the plural consolidated determinations being of the size and shape of plural cells served by the respective plural base stations. Further, in such implementations the OAM node/server 74 may provide the respective plural reports, and transmit over the interface 76 the information regarding one or more of the plural consolidated determinations to the plural base stations. In some example implementations the OAM node/server 74 transmits at least one of the plural consolidated determinations in at least one of (1) a modified eNB CONFIGURATION UPDATE X2 message; and (2) modified UE history information.

Figure 16:
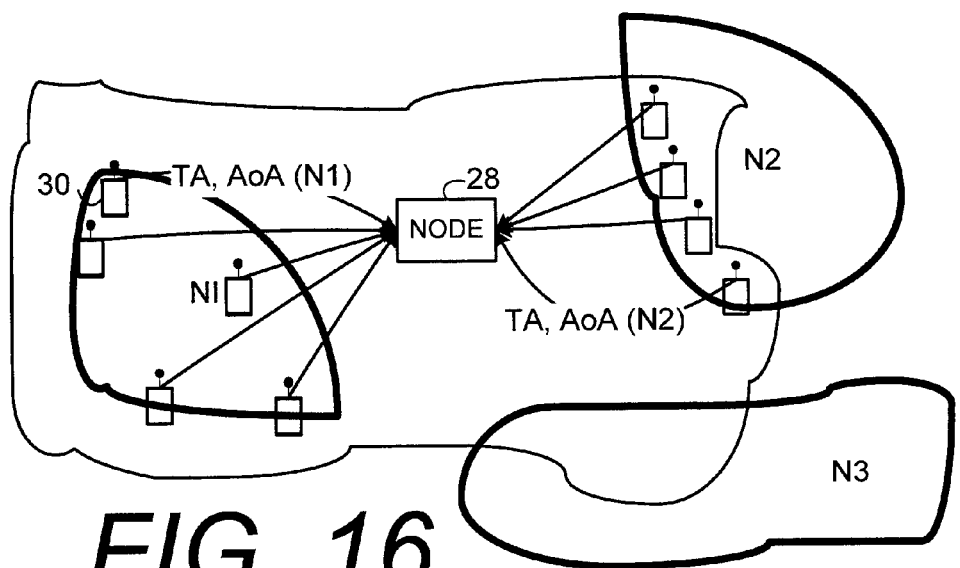
FIG. 16 is a diagrammatic view illustrating a method in which a base station node estimates size and boarders of a neighbor(s) according to an example mode.

Thus, as understood from the preceding discussion, the size/shape estimation that eNBs are performing about themselves or each other can be consolidated to get a better estimate. In one example embodiment of the technology disclosed herein, illustrated by way of example in FIG. 13, the eNBs send their estimated size as well as their neighbors towards an entity, such as an Operation and Management (OAM) node or server (e.g., OAM node/server 74). Other information that can be included in this are:

Information regarding whether the neighbor cell is totally inside its coverage area, or only shares some coverage area (cell N1 vs cell N2/N3 in FIG. 16, respectively).

The estimation accuracy (for example, how many samples were taken to make the estimation).

The estimation duration (or a detailed one that contains the start and end time of the estimation).

Based on these inputs from the eNBs, the OAM can combine them to get more accurate estimates. Different weights can be applied when combining the estimates about a given cell by its neighbors (for example, a neighbor which has performed the estimations based on more samples or longer duration gets a larger weight, or own cell size estimations are weighted higher than estimations by neighbor cells, etc.).

The OAM node/server 74, after combining the estimations from all the eNBs, can report the cell sizes to the concerned eNBs. For example, the OAM can send the final estimated size/shape to each cell, and the cell will communicate this information towards all its neighbors. Another way could be that the OAM node/server 74 may send a list of cell size/shape to the eNBs, which includes information about the concerned cell as well as its neighbors.

The communication of the consolidated cell size/shapes between neighboring nodes could be done using updated version of existing messages. One possibility is the use of a modified eNB CONFIGURATION UPDATE X2 message. Alternatively, modified UE history information, which contains detailed cell size/shape information instead of the limited "cell type" information that is currently specified, can be used. New messages could also be employed to perform this communication rather than modifying already existing ones.

In another example embodiment of the technology disclosed herein, the eNBs exchange their estimates directly towards their neighbors instead of sending it to the OAM, and the combination can be done by the eNBs themselves. And the eNBs can then later on exchange their consolidated size/shape between each other.

In another example embodiment of the technology disclosed herein, the estimation is performed periodically as set by an OAM system, and the eNBs report their estimations towards the OAM or each other whenever these configured durations elapse.

In another example embodiment of the technology disclosed herein, the eNBs report their estimations only when the current estimate differs considerably from the previous estimations. The threshold for determining a considerable difference can be configured by OAM.

In another example embodiment of the technology disclosed herein, illustrated by way of example in FIG. 16, node 28 gathers the TA and AoA of all the wireless terminals that are being handed over to it from a certain neighbor cell, and based on these values estimates the size of the neighbor cell. From the TA an AoA measurements, the parameter controller 40 of the node 28 of the measuring cell can determine if the neighbor cell is a small cell within the coverage area of the measuring cell and, if so, also an estimation of its size and shape. For example, in FIG. 16 the node 28 receives measurements from wireless terminals 30 which are served by a base station node of a neighbor cell N1 and measurements from wireless terminals 30 which are served by a base station node of a neighbor cell N2. By analyzing the measurements from wireless terminals 30 which are served by a base station node of a neighbor cell N1, the parameter controller 40 of node 28 may conclude that neighbor cell N1 is a small cell within the coverage area of the measuring cell. But in a situation in which the coverage area of the neighbor cell is not totally included in the measuring cell (for example, the cell N2 and the cell N3 in FIG. 16), the measuring cell may be able to determine only the size/shape of the portion of the neighbor cell that intersects with the coverage area of the measuring cell.

The time of stay of a wireless terminal in a cell may be dependent on the path taken by the wireless terminal. For example, a wireless terminal passing by the edge of a large cell can end up staying only for a short duration in that cell. In one example embodiment of the technology disclosed herein, the UE history information is augmented with the AoA estimation. Using this combined information the eNB can made more optimal decisions regarding whether to handover the UE to that cell or not. For example, assume the parameter controller 40 of a node 28 finds out that wireless terminals which are being handed over from a certain neighbor cell, and which have AoAs of 10 to 20 degrees, have a very short duration in the source cell as indicated in the received UE history information. On the other hand, the parameter controller 40 determines that the handed-over wireless terminals that have AoAs of 50 to 60 degrees have a very long duration. A possible explanation of this could be the former wireless terminals arriving at 10 to 20 degrees are arriving via a highway (e.g., a fast road), while the wireless terminals which are arriving along the 50 to 60 degree arrive via a walkway in a park or forest, for example. Thus, the parameter controller 40 can adjust the handover parameters of its wireless terminals later on depending on their AoA.

Figure 5:
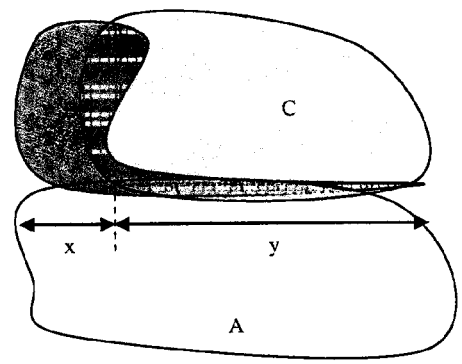
FIG. 5 is a diagrammatic view illustrating an example scenario in which cell shape and common boarder information may be important for making a proper handover decision.

A cell that is aware of the shape of itself and the shape of its neighbors and the overlapping regions with them can make an optimal handover decision. In one embodiment of the technology disclosed herein, the handover triggering parameters are scaled based on the shape/border information. For example, the CIO towards a certain neighbour can be scaled according to the size of the overlapping region with the concerned neighbour. Another way could be to use the AoAs and TAs on top of the handover triggering parameters. For example, for the case shown in FIG. 5, an optimal decision will be to handover the wireless terminal to cell B in region x and hand it over to cell C in region y, while the consideration of only the radio conditions might lead to the handover to cell B in both cases.

Figure 7F:
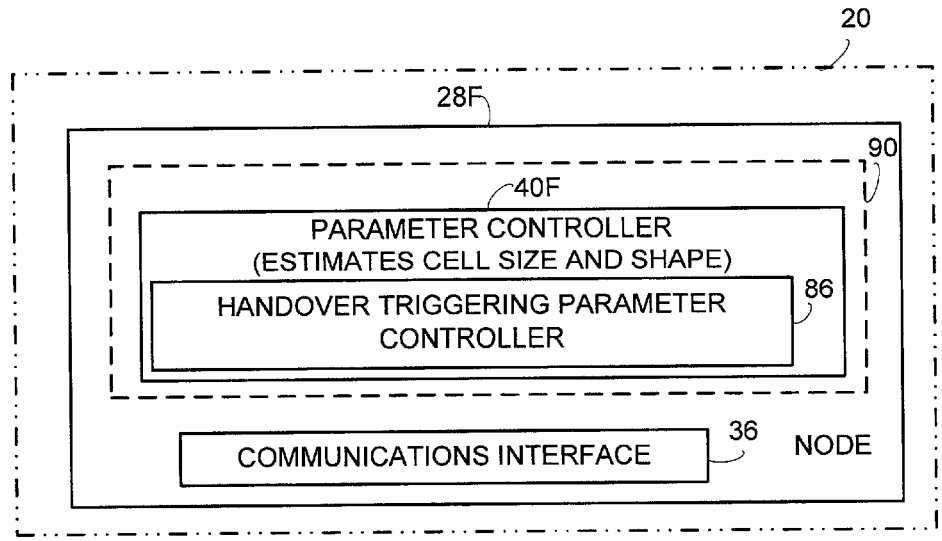
FIG. 7F is a schematic view of an example communications network comprising a parameter controller which in turn comprises a handover triggering parameter controller.

FIG. 7F illustrates an example embodiment of a node 28F comprising a parameter controller 40F which also establishes or modifies a handover triggering parameter dependent on the size and/or the shape of the cell served by the base station. To this end, the parameter controller 40F comprises handover triggering parameter controller 86. As used herein, a handover parameter and/or a handover triggering parameter include but are not limited to handover offset values (involving in determining how much better a measurement from the target cell must be than the serving cell in order to trigger handover); time to trigger (the handover) value; and a hysteresis value involved the handover.

Figure 17A:
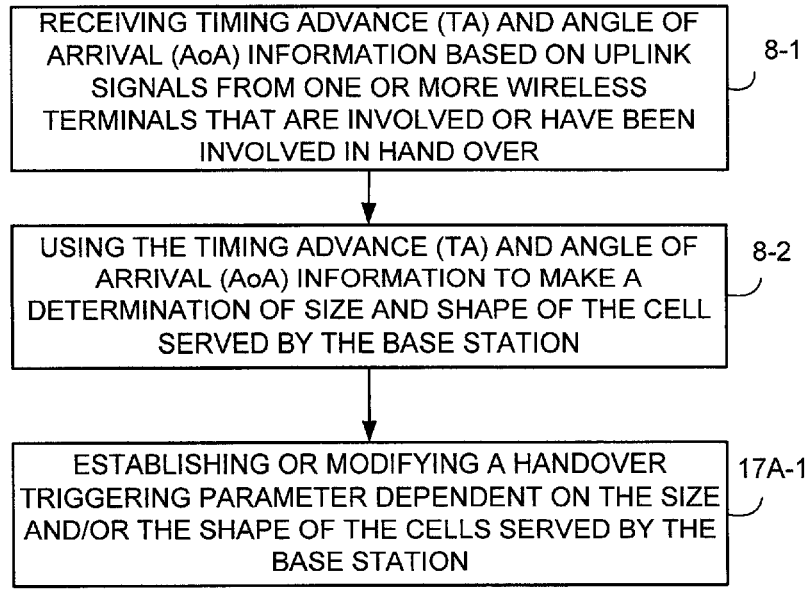
FIG. 17A is a flowchart illustrating example acts or steps of method performed by a parameter controller of the embodiment of FIG. 7F including establishing or modifying a handover triggering parameter.
Figure 17B:
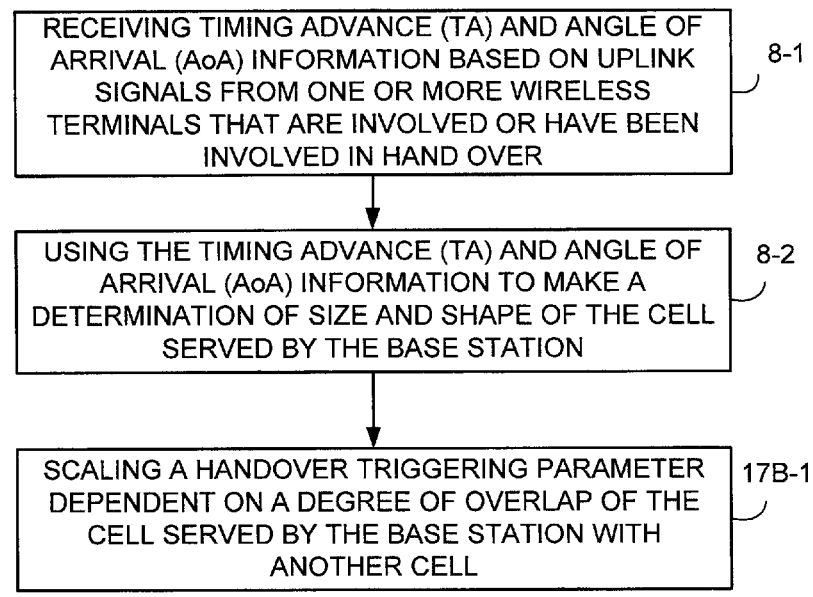
FIG. 17B is a flowchart illustrating example acts or steps of method performed by a parameter controller of the embodiment of FIG. 7F scaling a handover triggering parameter dependent on a degree of cell overlap.

FIG. 17A illustrates example acts or steps involved in an example method performed by the parameter controller 40F of FIG. 7F. Act 8-1 and act 8-2 are essentially comparable to acts of FIG. 8, resulting in using the timing advance (TA) and angle of arrival (AoA) information to make a determination of size and shape of the cell served by the base station. Act 17A-1 comprises parameter controller 40F establishing or modifying a handover triggering parameter dependent on the size and/or the shape of the cell served by the base station. FIG. 17B illustrates another example act or step that may be performed by the parameter controller 40F of FIG. 7F: scaling a handover triggering parameter dependent on a degree of overlap of the cell served by the base station with another cell (act 17B-1).

A further optimization can also be envisioned for cases where the third cell C is not a direct neighbour of cell A. In this case, cell A will start the handover process to B, and cell B, when it realizes that the wireless terminal is approaching it from region y, can immediately start preparing cell C for the handover without waiting for measurement reports from the UE. In this case, even if a connection failure occurs, the UE context will be available in cell C and the UE can re-establish its connection fast without being forced to go to IDLE mode.

Figure 7G:
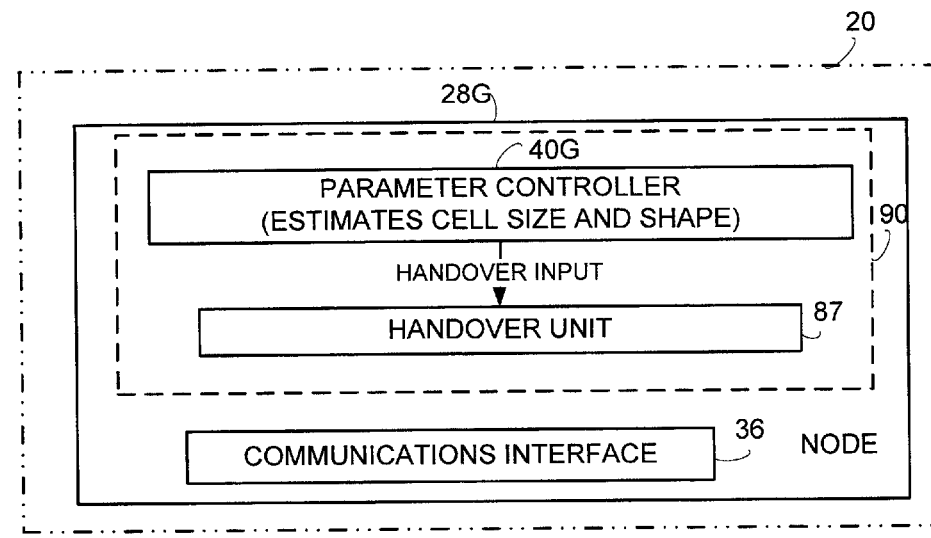
FIG. 7G is a schematic view of an example communications network comprising a node which selects between plural target cells based on cell size and shape information.
Figure 18:
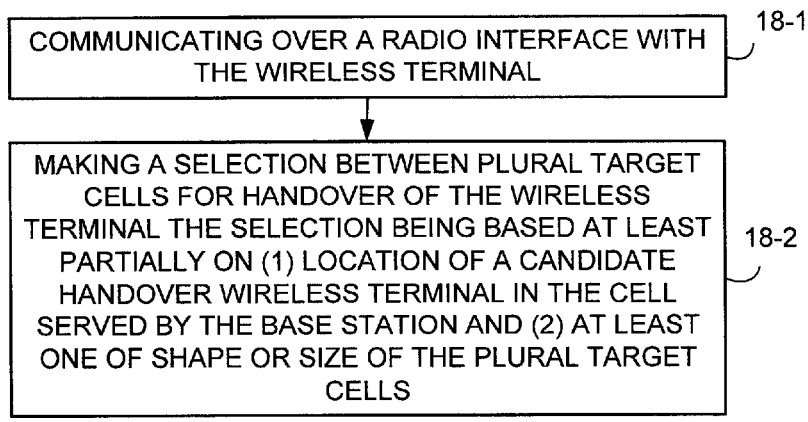
FIG. 18 shows basic acts or steps performed of a method performed by the node of FIG. 7G comprising selecting between plural target cells for handover.

FIG. 7G illustrates an example embodiment of a node 28G in which the parameter controller 40G supplies cell size and cell shape information to handover unit 88, and thereby essentially initiates handover of a wireless terminal to another cell in view of at least one of size and shape of the cell served by the base station 28G. FIG. 18 shows basic acts or steps performed by the node 28G of FIG. 7G. Act 18-1 comprises communicating over a radio interface with a wireless terminal. Act 18-2 comprises making a selection between plural target cells for handover of the wireless terminal. The selection of act 18-2 is based at least partially on (1) location of a candidate handover wireless terminal in the cell served by the base station and (2) at least one of shape or size of the plural target cells.

Figure 7H:
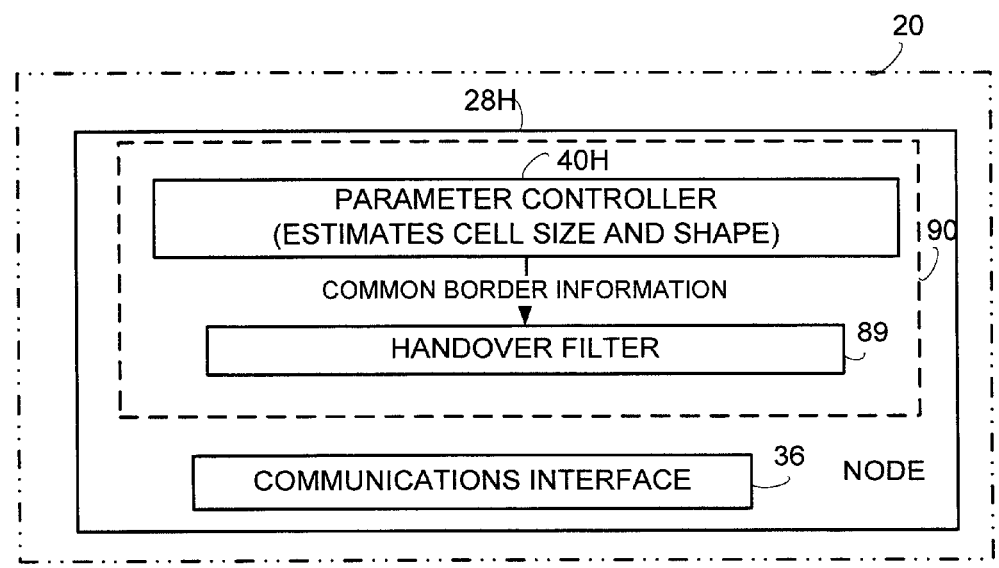
FIG. 7H is a schematic view of an example communications network comprising a parameter controller which determines a cell common border and provides the cell common border information to a handover filter function.

The cell shape and border information can come very handy in inter-frequency deployment scenarios. If a cell is aware of the common borders of a cell that uses another frequency, it can disable that frequency from the measured frequencies of all wireless terminals that are far away from the common border and enable it only when if a UE approaches the border. This way, wireless terminals will not spend their power unnecessarily trying to measure frequencies that are not relevant due to their current location. Accordingly, FIG. 7H illustrates an example embodiment of a node 28H in which the parameter controller 40H uses the TA information and the AoA information to determine a common border of the cell served by the base station which hosts parameter controller 40H and another cell that uses another frequency. As shown in FIG. 7H, the parameter controller 40H provides the common border information to a handover filter function 89.

Figure 19:
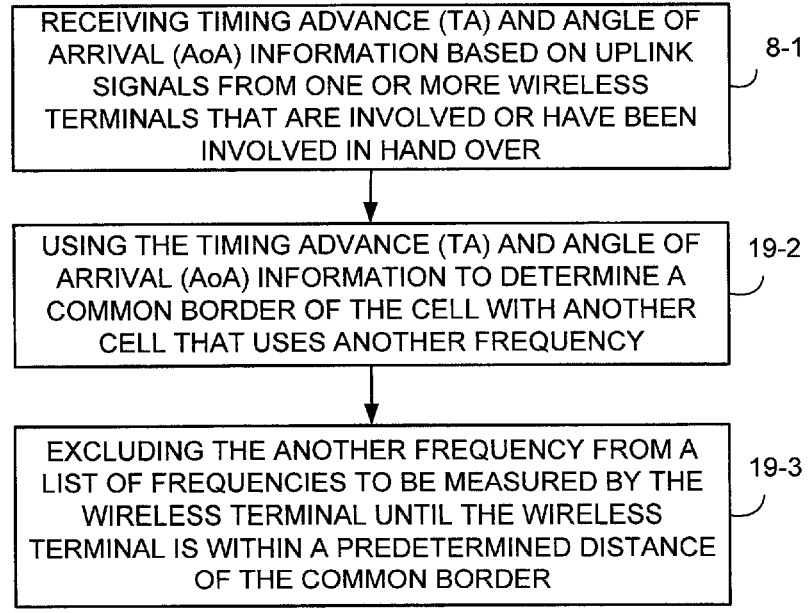
FIG. 19 is a flowchart illustrating example acts or steps involved in an example method performed by the parameter controller of FIG. 7H involving excluding the another frequency from a list of frequencies to be measured by the wireless terminal until a wireless terminal is within a predetermined distance of the cell common border.

FIG. 19 shows example acts or steps which may be performed by the example node 28H of FIG. 7H. Act 8-1 of FIG. 19 comprises receiving timing advance (TA) and angle of arrival (AoA) information based on uplink signals from one or more wireless terminals that are involved or have been involved in handover. Act 19-2 comprises using the timing advance (TA) and angle of arrival (AoA) information to determine a common border of the cell with another cell that uses another frequency. Act 19-3 comprises excluding the another frequency from a list of frequencies to be measured by the wireless terminal until the wireless terminal is within a predetermined distance of the common border.

If a cell is not deployed completely inside the coverage area of another eNB (for macros and small cells that are deployed near cell borders, and hence share coverage area with two or more neighbor cells), the partial information from all of its different neighbors can be combined to get its total size/shape.

In the example embodiments illustrated herein, a broken line which frames the parameter controller 40 may depict the fact that the parameter controller 40, and typically other units or functionalities, may comprise, be realized by, and/or be included in electronic circuitry and particularly by a platform 90, such platform being framed by the broken line. The terminology "platform" is a way of describing how the functional units or entities framed thereby may be implemented or realized by machine including electronic circuitry. One example platform is a computer implementation wherein one or more of the broken line-framed elements are realized by one or more processors which execute coded instructions and which use non-transitory signals in order to perform the various acts described herein. In such a computer implementation the wireless terminal may comprise, in addition to a processor(s), a memory section, which in turn may comprise a random access memory; a read only memory; an application memory; and any other memory such as cache memory, for example. The memory section, e.g., the application memory, may store, e.g., coded instructions which can be executed by the processor to perform acts described herein. Typically the platform also comprises other input/output units or functionalities, such as a keypad; an audio input device, e.g., microphone; a visual input device, e.g., camera; a visual output device; and an audio output device, e.g., a speaker. Other types of input/output devices can also be connected to or comprise the wireless terminal. Another example platform suitable for the wireless terminal is that of a hardware circuit, e.g., an application specific integrated circuit (ASIC) wherein circuit elements are structured and operated to perform the various acts described herein.

The embodiments of technology disclosed herein and encompassed hereby have numerous advantages. Example, non-limiting advantages include:

- The embodiments are transparent to the UE, and thus release 8 UEs can benefit from them.
- The technology disclosed herein makes it possible to determine the size and shape of cells, as well as their overlapping regions, which is very difficult to get during radio planning phase, especially in HetNets where the nodes can be deployed in uncoordinated fashion (even by end users).
- A cell that is aware of the shape of itself and its neighbours and its overlapping regions with them can make an optimal handover decision, either by setting handover triggering conditions that are dependent on the common border/overlapping regions or/and using AoA/TA information on top of (or instead of) the already standardized handover triggering parameters.
- Pre-emptive handover preparations can be performed for UEs that are not expected to stay that long in the cell, even if the current radio conditions are not demanding it.
- A cell that is aware of the borders/common regions with neighbours that is using another frequency can enable its UEs to measure the other frequency only when they are in the vicinity of such cells, thereby leading to considerable UE power savings.
- It is a flexible system that can be realized either at via the OAM or through peer to peer communication between neighboring nodes. Thus, it is viable both for coordinated and uncoordinated deployments, respectively.

The following are example abbreviations used herein:
3GPP 3$^{rd}$ Generation Partnership Project
AoA Angle of Arrival
CIO Cell Individual Offset
CGI Cell Global ID
CSG Closed Subscriber Group
CQI Channel Quality Indicator
DAS Distributed Antenna System
eNB E-UTRAN NodeB (base station)
HeNB Home eNB
HetNet Heterogeneous Network
HO Handover
HOF Handover Failure
HSPA High Speed Packet Access
LTE Long Tenn Evolution
MIMO Multiple Input Multiple Output
MDT Mobile Drive Test
MRO Mobility Robustness Optimization
OAM Operation and Maintenance
QoS Quality of Service
RA Random Access
RACH Random Access Channel
RAN Radio Access Network
RE Resource Element
RLF Radio Link Failure
RRC Radio Resource Control
RS Reference Symbol
RSRP Reference Signal Received Power
RSRQ Reference Signal Received Quality
RSTD Reference Signal Timing Difference
SON Self Optimizing Network
SR Scheduling Request
SRS Sounding Reference Signal
TA Timing Advance
TTT Time To Trigger
UE User Equipment
WCDMA Wideband Code Division Multiple Access
X2 Interface between eNBs Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A telecommunications node comprising:
    a communication interface through which the node acquires timing advance (TA) information and angle of arrival (AoA) information based on uplink signals received over a radio interface from one or more wireless terminals that are involved in or have been involved in handover; and
    a controller configured to make a determination of size and shape of a cell of a radio access network based on the TA information and the AoA information.

2. The node of claim 1:
    wherein the node comprises a base station serving the cell of the radio access network;
    wherein the communication interface comprises a radio communication interface.

3. The node of claim 2:
    wherein the base station uses a first frequency;
    wherein the controller is further configured to use the TA information and the AoA information to determine a common border of the cell with another cell that uses another frequency; and
    wherein the controller is further configured to exclude the another frequency from a list of frequencies to be measured by the wireless terminal until the wireless terminal is within a predetermined distance of the common border.

4. The node of claim 3, wherein the controller is further configured to scale a handover triggering parameter dependent on a degree of overlap of the cell with the another cell.

5. The node of claim 1, wherein the controller is further configured to establish or modify a handover triggering parameter dependent on at least one of the size and the shape of the cell.

6. The node of claim 1, wherein the controller is further configured to initiate handover of the wireless terminal to another cell in view of at least one of the size and the shape of the cell.

7. The node of claim 1, wherein the controller is configured to make the size and shape determination by preparing a list of angles from a center of the cell, the list of angles including the received AOA information, and for angles included on the list, associating the TA information as radii of the cell.

8. The node of claim 1, wherein the controller is configured to periodically make the determination of the size and the shape of the cell.

9. The node of claim 1, wherein the controller is further configured to use speed of travel of the one or more of the wireless terminals to make the determination of the size and the shape of the cell.

10. The node of claim 1, wherein the controller is further configured to make at least a partial determination of at least one of a size and shape of another cell based on the TA information and the AoA information received from the one or more wireless terminals that are involved in handover.

11. The node of claim 10, wherein the cell comprises a macro cell and the another cell comprises a cell served by another base station, the another base station located in an interior of the macro cell.

12. The node of claim 10, wherein the partial determination comprises a determination of at least one of the size and the shape of a portion of the another cell that intersects with the cell.

13. The node of claim 1, wherein the controller is further configured to make the determination based on UE history information provided to the node by a wireless terminal which has been handed over from another cell.

14. The node of claim 1, wherein the node is provided with pre-configured shape information, and the controller is configured to make the determination based on the TA information and the AoA information in conjunction with the pre-configured shape information.

15. The node of claim 1, further comprising another communication interface through which the node provides a report of information concerning the size and the shape of the cell to another base station or to another node.

16. The node of claim 15, wherein the node is further configured to receive from the another node, through the another communication interface, a consolidated determination of at least one of the size and the shape of the cell, the consolidated determination having been made by the another node on the basis of respective plural reports of information regarding size and shape of the cell, the respective plural reports including a report from the node and from other nodes.

17. The node of claim 1, wherein the node comprises a base station,
and wherein the controller is further configured to make a selection between plural target cells for handover of a wireless terminal based on:
a location of a candidate handover wireless terminal in the cell served by the base station; and
at least one of shape and size of the plural target cells.

18. A node of a communications network comprising:
an interface through which the node receives, from plural base stations of a radio access network, respective plural reports of information regarding size and shape of a cell served by a selected base station, the respective plural reports including a report from the selected base station which includes a unilateral determination of the size and the shape of the cell served by the selected base station, the unilateral determination having been made based on timing advance (TA) information and angle of arrival (AoA) information based on uplink signals, which the selected base station received from one or more wireless terminals that were involved in handover; and
a controller configured to make a consolidated determination of at least one of the size and the shape of the cell served by the selected base station based on the plural reports.

19. The node of claim 18:
wherein at least some of the plural reports include an accuracy assessment regarding the information contained in the corresponding plural report; and
wherein the controller, in making the consolidation determination, weights the information contained in the respective reports in accordance with the accuracy assessment included in the respective reports.

20. The node of claim 19, wherein the accuracy assessment comprises at least one of a number of samples of the uplink signals and a duration of sampling of the uplink signals.

21. A method of operating a telecommunications node comprising:
obtaining timing advance (TA) information and angle of arrival (AoA) information based on uplink signals received over a radio interface from one or more wireless terminals that are involved or have been involved in handover; and
making a determination of size and shape of a cell of a radio access network based on the TA information and the AoA information.

22. The method of claim 21, further comprising establishing or modifying a handover triggering parameter dependent on at least one of the size and the shape of the cell.

23. The method of claim 22, further comprising scaling the handover triggering parameter dependent on a degree of overlap of the cell with another cell.

24. The method of claim 21, further comprising initiating handover of one of the wireless terminals to another cell based on at least one of the size and the shape of the cell.

25. The method of claim 21, wherein the node comprises a base station that uses a first frequency, and wherein the method further comprises:
using the TA information and the AoA information to determine a common border of the cell with another cell that uses another frequency; and
excluding the another frequency from a list of frequencies to be measured by one of the wireless terminals until the wireless terminal is within a predetermined distance of the common border.

26. The method of claim 21, wherein making the determination comprises:
preparing a list of angles from a center of the cell, the list of angles including the received AoA information; and
for angles included on the list, associating the TA information as radii of the cell.

27. The method of claim 21, wherein making the determination further comprises using speed of travel of the one or more of the wireless terminals.

28. The method of claim 21, further comprising making at least a partial determination of at least one of the size and the shape of another cell using the TA information and the AoA information based on the uplink signals which the node receives from the one or more wireless terminals that are involved in handover.

29. The method of claim 28, wherein the partial determination comprises a determination of the size and the shape of a portion of the another cell that intersects with the cell.

30. The method of claim 21, wherein making the determination further comprises using UE history information provided to the node by a wireless terminal which has been handed over.

31. The method of claim 21:
wherein the node has pre-configured shape information;
wherein making the determination comprises making the determination of the size and shape of the cell based on the TA information and the AoA information in conjunction with the pre-configured shape information.

32. The method of claim 21, further comprising the node providing a report of information concerning the size and the shape of the cell to another node.

33. The method of claim 32, further comprising receiving, from the another node, a consolidated determination of at least one of the size and the shape of the cell, the consolidated determination having been made by the another node based on respective plural reports of information regarding the size and shape of the cell, the respective plural reports including a report from the node and from at least one other node.

34. The method of claim 21, wherein the method is operated by a base station serving a cell of the radio access network, the method further comprising:
communicating over a radio interface with a wireless terminal;
making a selection between plural target cells for handover of the wireless terminal based on:
a location of a candidate handover wireless terminal in the cell served by the base station; and
at least one of shape and size of the plural target cells.

35. A method of operating a node of a communications network comprising:
receiving, from plural base stations of a radio access network, respective plural reports of information regarding a size and a shape of a cell served by a selected base station, the plural reports including a report from the selected base station which includes a unilateral determination of the size and the shape of the cell served by the selected base station, the unilateral determination having been made using timing advance (TA) information and angle of arrival (AoA) information based on uplink signals which the selected base station received from one or more wireless terminals that were involved in handover; and
making a consolidated determination of at least one of the size and the shape of the cell served by the selected base station based on the plural reports.

36. The method of claim 35:
wherein at least some of the plural reports include an accuracy assessment regarding the information contained in the respective reports;
wherein making the consolidation determination comprises making the consolidated determination by weighting the information contained in the respective reports in accordance with the accuracy assessment included in the respective reports.

37. The method of claim 36, wherein the accuracy assessment comprises at least one of a number of samples of the uplink signals and a duration of sampling of the uplink signals.

38. The method of claim 35, further comprising:
making plural consolidated determinations, each of the plural consolidated determinations comprising the size and shape of the plural cells served by the respective plural base stations which provide the respective plural reports; and
transmitting information regarding one or more of the plural consolidated determinations to the plural base stations.

* * * * *